US011427902B2

(12) United States Patent
Kang et al.

(10) Patent No.: US 11,427,902 B2
(45) Date of Patent: Aug. 30, 2022

(54) ADDITIVE MANUFACTURING OF IRON-BASED AMORPHOUS METAL ALLOYS

(71) Applicant: CORNERSTONE INTELLECTUAL PROPERTY, LLC, Lake Forest, CA (US)

(72) Inventors: John Kang, Lake Forest, CA (US); Ricardo Salas, Lake Forest, CA (US); Evelina Vogli, Lake Forest, CA (US)

(73) Assignee: CORNERSTONE INTELLECTUAL PROPERTY, LLC, Lake Forest, CA (US)

( * ) Notice: Subject to any disclaimer, the term of this patent is extended or adjusted under 35 U.S.C. 154(b) by 277 days.

(21) Appl. No.: 16/575,842

(22) Filed: Sep. 19, 2019

(65) Prior Publication Data

US 2021/0087663 A1    Mar. 25, 2021

(51) Int. Cl.
   *C22C 45/02*   (2006.01)
   *B33Y 10/00*   (2015.01)
   (Continued)

(52) U.S. Cl.
   CPC .............. *C22C 45/02* (2013.01); *B22F 1/05* (2022.01); *B22F 1/10* (2022.01); *B23K 20/10* (2013.01);
   (Continued)

(58) Field of Classification Search
   CPC . C22C 1/002; C22C 2001/1073; C22C 45/02; B22F 1/0059–77; B22F 10/14; B22F 10/16; B23K 20/10
   See application file for complete search history.

(56) References Cited

U.S. PATENT DOCUMENTS 6,519,500 B1 * 2/2003 White ............... G05B 19/4099
                                                      700/119
11,117,212 B2 * 9/2021 Hsu ....................... B23K 20/10
(Continued)

FOREIGN PATENT DOCUMENTS

CN    109868392 A  *  6/2019

OTHER PUBLICATIONS

Asami, K., et al. "Preparation and corrosion resistance of Fe—Cr—Mo—CBP bulk glassy alloys." Journal of the Electrochemical Society 149.8 (2002): B366. (Year: 2002).*

*Primary Examiner* — Anthony J Zimmer
*Assistant Examiner* — Sean P. O'Keefe
(74) *Attorney, Agent, or Firm* — Dave Law Group LLC; Raj S. Davé

(57) ABSTRACT

Embodiments disclosed herein relate to production of amorphous alloys having compositions of iron, chromium, molybdenum, carbon and boron for usage in additive manufacturing, such as in layer-by-layer deposition to produce multi-functional parts. Such parts demonstrate ultra-high strength without sacrificing toughness and also maintain the amorphous structure of the materials during and after manufacturing processes. An Amorphous alloy composition has a formula $Fe_{100-(a+b+c+d)}Cr_aMo_bC_cB_d$, wherein a, b, c and d represent an atomic percentage, wherein: a is in the range of 10 at. % to 35 at. %; b is in the range of 10 at. % to 20 at. %; c is in the range of 2 at. % to 5 at. %; and d is in the range of 0.5% at. % to 3.5 at. %.

12 Claims, 13 Drawing Sheets

(51) Int. Cl.
*B33Y 70/00* (2020.01)
*B22F 1/05* (2022.01)
*B22F 1/10* (2022.01)
*C21D 6/00* (2006.01)
*B23K 26/342* (2014.01)
*C22C 33/00* (2006.01)
*B33Y 40/10* (2020.01)
*B23K 20/10* (2006.01)
*B23K 103/02* (2006.01)

(52) U.S. Cl.
CPC ............ *B23K 26/342* (2015.10); *B33Y 10/00* (2014.12); *B33Y 40/10* (2020.01); *B33Y 70/00* (2014.12); *C21D 6/002* (2013.01); *C22C 33/003* (2013.01); *B22F 2301/35* (2013.01); *B22F 2304/10* (2013.01); *B23K 2103/02* (2018.08)

(56) References Cited

U.S. PATENT DOCUMENTS

| | | | | |
|---|---|---|---|---|
| 2005/0084407 | A1* | 4/2005 | Myrick | B22F 1/0003 |
| | | | | 419/66 |
| 2013/0052361 | A1* | 2/2013 | Croopnick | C22C 33/003 |
| | | | | 427/456 |
| 2017/0080497 | A1* | 3/2017 | Tuffile | B22F 3/1021 |
| 2018/0162013 | A1* | 6/2018 | Fulop | B29C 64/40 |
| 2019/0232430 | A1* | 8/2019 | Gong | B23K 20/103 |
| 2021/0317552 | A1* | 10/2021 | Kim | C22C 45/02 |

\* cited by examiner

ADDITIVE MANUFACTURING OF IRON-BASED AMORPHOUS METAL ALLOYS

TECHNICAL FIELD

Disclosed herein are processes for preparing iron-based amorphous metals for use in additive manufacturing. The processes involve layer-by-layer deposition of the amorphous metals to produce multi-functional parts with ultra-high strength, without sacrificing toughness, resulting in produced parts showing superior corrosion and wear resistance due to their amorphous structure.

BACKGROUND

Compared to metallic alloy materials with a crystalline microstructure, "i[t] is widely known that metallic glasses are solid alloys [that] [exhibit] many superior properties", where "[t]he unique properties [of metallic glasses] originate from [their] random atomic arrangement . . . that contrasts with the regular atomic lattice arrangement found in crystalline alloys." [Source: "Classification of Bulk Metallic Glasses by Atomic Size Difference, Heat of Mixing and Period of Constituent Elements and Its Application to Characterization of the Main Alloying Element"; Takeuchi, A.; Inoue, A.; *Materials Transactions*, Vol. 46, No. 12 (2005) pp. 2817 to 2829].

And, "[t]he mechanical properties of amorphous alloys have proven both scientifically unique and of potential practical interest, although the underlying deformation physics of these materials remain less firmly established as compared with crystalline alloys." [Source: Mechanical behavior of amorphous alloys"; Schuh, C.; Hufnagel, T.; Ramamurty, U.; Acta Materialia 55 (2007) 4067 4109]. Further, "[t]he mechanics of metallic glasses have proven to be of fundamental scientific interest for their contrast with conventional crystalline metals, and also occupy a unique niche compared with other classes of engineering materials. For example, amorphous alloys generally exhibit elastic moduli on the same order as conventional engineering metals . . . but have room-temperature strengths significantly in excess of those of polycrystals with comparable composition . . . . The consequent promise of high strength with non-negligible toughness has inspired substantial research effort on the room-temperature properties of metallic glasses." [Source: Mechanical behavior of amorphous alloys"; Schuh, C.; Hufnagel, T.; Ramamurty, U.; Acta Materialia 55 (2007) 4067 4109].

Therefore, methods of manufacturing have been developed to take advantage of the desirable physical properties of amorphous alloys. For example, U.S. Pat. No. 8,215,371, incorporated herein by reference in its entirety, discusses a method for building a three-dimensional object in a layer-by-layer manner, the method involving heating a build chamber, and feeding a solid feedstock thereto. The solid feedstock is made from of a modeling material having an amorphous metallic alloy and may be fed into a liquefier assembly of the build chamber. The modeling material of the solid feedstock in the liquefier assembly is heated to an extrudable state. The heated modeling material is deposited within the heated build chamber in a predetermined pattern to build the three-dimensional object.

However, production of amorphous alloys for manufacturing remains challenging, given that "[i]t is essential for the formation of an amorphous phase by rapid solidification to suppress the nucleation and growth reaction of a crystalline phase in the supercooled liquid region between melting temperature ($T_m$) and $T_g$. The minimum cooling rate for glass formation (Re) has been reported to be above $10^4$ K/s for Fe-, Co- and Ni-based amorphous alloys . . . etc." [Source: High Strength Bulk Amorphous Alloys with Low Critical Cooling Rates; Inoue, A.; *Materials Transactions, JIM*, Vol. 36, No. 7 (1995), pp. 866 to 875]. Such rapid cooling rates may limit the forms in which amorphous metallic alloys may be produced to ribbons, foils, or wires, in which one dimension is small enough to permit for the convenient extraction of heat to achieve the necessary cooling rate. [Source: U.S. Pat. No. 5,306,363 stating in part that: "[c]onventional amorphous alloys have been produced in the form of a ribbon, a wire, a powder or a coating film etc.].

Accordingly, it would be desirable to develop an amorphous metal having a unique composition such that the amorphous metal is capable of providing additional versatility for additive manufacturing. Moreover, additive manufacturing with such an amorphous metal may be conducted by controlling a heating source power and cooling rate without affecting previously deposited amorphous metal layers.

SUMMARY

An embodiment relates to an amorphous alloy composition comprising: iron, chromium, molybdenum, carbon and boron, wherein an oxygen level of the amorphous alloy composition is up to 0.2 at. % oxygen.

An embodiment relates to an amorphous alloy composition, wherein the amorphous alloy composition is by a formula of $Fe_{100-(a+b+c+d)}Cr_aMo_bC_cB_d$, wherein a, b, c and d represent an atomic percentage.

An embodiment relates to an amorphous alloy composition, wherein the amorphous alloy composition is used for additive manufacturing.

An embodiment relates to an amorphous alloy composition, wherein:
a is in the range of 10 at. % to 35 at. %;
b is in the range of 10 at. % to 20 at. %;
c is in the range of 2 at. % to 5 at. %; and
d is in the balance of 0.5% at. % to 3.5 at. %.

An embodiment relates to an amorphous alloy composition, wherein the amorphous alloy composition is in powder form.

An embodiment relates to an amorphous alloy composition, wherein the amorphous alloy composition having up to 0.2 at. % oxygen has a glass-forming ability that is higher than that of a comparable amorphous alloy composition having a same composition as that of the amorphous alloy composition except that that the comparable amorphous alloy composition contains greater than 0.2 at. % oxygen, wherein the glass forming ability is a property to generate a layer of an amorphous material when the amorphous alloy composition or the comparable amorphous alloy composition is exposed to wear, load or friction, and the glass forming ability being higher means that the property to generate the layer of the amorphous material when the amorphous alloy composition or the comparable amorphous alloy composition is exposed to wear, load or friction is greater.

An embodiment relates to an amorphous alloy composition, wherein the powder has a sphericity of more than 80%.

An embodiment relates to an amorphous alloy composition, wherein the powder has a flowability of less than 20 seconds per 50 grams.

An embodiment relates to an amorphous alloy composition, wherein the powder has a particle size larger than 10 micrometers.

An embodiment relates to an amorphous alloy composition, wherein the powder has a bimodal particle size distribution with fine particles as much as 30% in volume.

An embodiment relates to a method for producing a metallic alloy specimen, the method comprising: melting amorphous feedstock having a composition of iron, chromium, molybdenum, carbon and boron, wherein an oxygen level of the amorphous alloy composition is up to 0.2 at. % oxygen; and re-solidifying the molten amorphous feedstock to eliminate formation of a crystalline structure therein by controlling a heating source power and a cooling rate without affecting previously deposited amorphous feedstock layers.

An embodiment relates to a method, wherein the method comprises additive manufacturing.

An embodiment relates to a method, wherein the amorphous alloy composition has a formula of $Fe_{100-(a+b+c+d)}Cr_aMo_bC_cB_d$, wherein a, b, c and d represent an atomic percentage.

An embodiment relates to a method, wherein:
a is in the range of 10 at. % to 35 at. %;
b is in the range of 10 at. % to 20 at. %;
c is in the range of 2 at. % to 5 at. %; and
d is in the balance of 0.5% at. % to 3.5 at. %.

An embodiment relates to a method, wherein the heating source is selected from a group consisting of: a laser, an electron beam, a plasma, an arc, and an infrared source.

An embodiment relates to a method, wherein the amorphous feedstock is in powder, wire or foil form.

An embodiment relates to a method, wherein the cooling rate is $10^{4°}$ C./s to $100°$ C./s.

An embodiment relates to a method, wherein the cooling rate is $100°$ C./s or slower.

An embodiment relates to a method, wherein the metallic alloy specimen has an amorphous phase content of between 20% to 100%.

An embodiment relates to a method, wherein the metallic alloy specimen further comprises: an outermost surface that is phase transformed into a thin amorphous layer.

An embodiment relates to a method, wherein the metallic alloy specimen is at least partially crystalline beneath the outermost surface.

An embodiment relates to a method, wherein the metallic alloy specimen is produced by ultrasonic additive manufacturing.

In an embodiment, the ultrasonic additive manufacturing further comprises: cold welding of thin foils.

An embodiment relates to a method, wherein the thin foils each have a thickness of 250 micrometers or less.

An embodiment relates to a method, wherein the metallic alloy specimen has an amorphous phase content of between 20% to 100%.

An embodiment relates to a method for manufacturing a metallic alloy specimen, the method comprising: mixing a powder material having a composition of iron, chromium, molybdenum, carbon and boron, wherein an oxygen level of the composition is up to 0.2 at. % oxygen, with a liquid binding agent to form a mix; and depositing a layer of the mix to a selected area.

An embodiment relates to a method, further comprising: applying another layer of the mix to bind to a previously deposited layer.

An embodiment relates to a method, further comprising: repeating application of additional layers of the mix to complete manufacturing the metallic alloy specimen.

An embodiment relates to a method, further comprising: incinerating the liquid binding agent.

An embodiment relates to a method, further comprising: melting the powder material to produce a molten alloy.

An embodiment relates to a method, further comprising: infiltrating the molten alloy into the metallic alloy specimen, wherein the metallic alloy specimen has a defined porosity for receiving the molten alloy.

An embodiment relates to a method, wherein the metallic alloy specimen has an amorphous phase content of between 20% to 100%.

An embodiment relates to a method, further comprising: cooling the metallic alloy specimen.

An embodiment relates to a method, wherein the cooling occurs at a cooling rate of $10^{4°}$ C./s to $100°$ C./s.

An embodiment relates to a method, wherein the cooling occurs at a cooling rate of $100°$ C./s or slower.

An embodiment relates to a method, wherein the metallic alloy specimen is at least partially crystalline.

An embodiment relates to a method, wherein an outermost surface of the metallic alloy specimen is phase transformed into a thin amorphous layer.

DETAILED DESCRIPTION

Definitions and General Techniques

All publications, patents, and patent applications cited in this application ("Specification") are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively high rates, and they retain the amorphous, non-crystalline (i.e., glassy) state at room temperature. Amorphous alloys have many superior properties, e.g., physical properties, than their crystalline counterparts. However, if the cooling rate is not sufficiently high, crystals may form inside the alloy during cooling, so that the unique benefits of the amorphous state can be lost. For example, one challenge with the fabrication of bulk amorphous alloy parts is the partial crystallization of parts due to either slow cooling or impurities prevalent in the raw alloy material. As a high degree of amorphicity (and, conversely, a low degree of crystallinity) is desirable in BMG parts, there is a need to develop methods for casting BMG parts having predictable and controlled amount of amorphicity.

Figure 1:
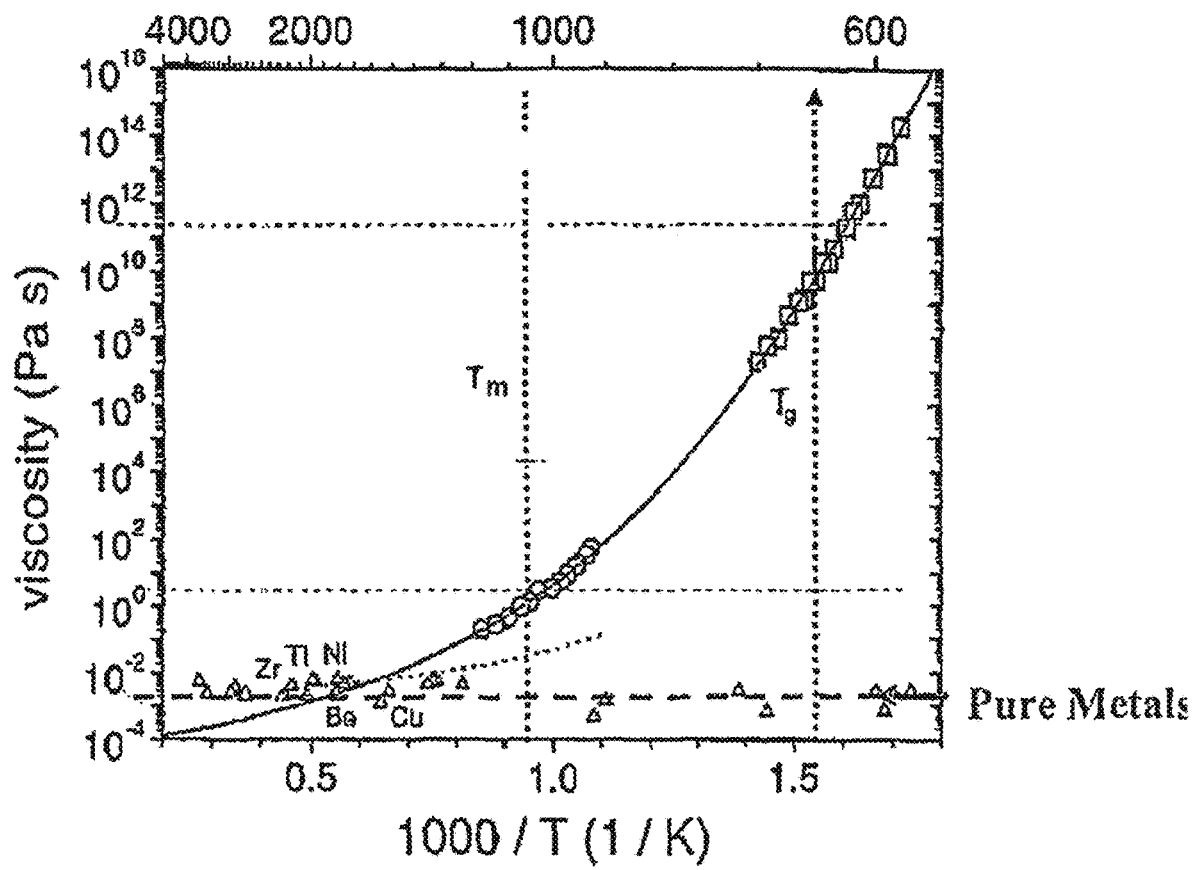
FIG. 1 provides a temperature-viscosity diagram of a bulk solidifying amorphous alloy.

FIG. 1 (obtained from U.S. Pat. No. 7,575,040) shows a viscosity-temperature graph of a bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
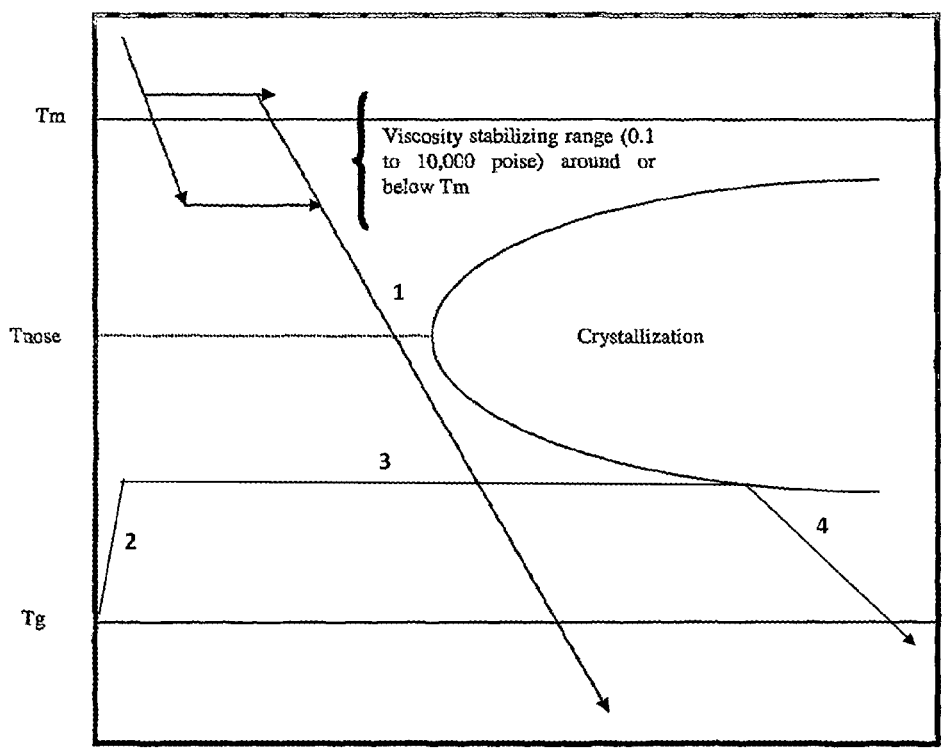
FIG. 2 provides a schematic of a time-temperature-transformation (TTT) diagram for a bulk solidifying amorphous alloy.

FIG. 2 (obtained from U.S. Pat. No. 7,575,040) shows a time-temperature-transformation (TTT) cooling curve 200 of a bulk solidifying amorphous alloy, or TTT diagram. Bulk-solidifying amorphous metals do not experience a liquid/solid crystallization transformation upon cooling, as with conventional metals. Instead, the highly fluid, non-crystalline form of the metal found at high temperatures (near a "melting temperature" $T_m$) becomes more viscous as the temperature is reduced (near to the glass transition temperature $T_g$), eventually taking on the outward physical properties of a conventional solid.

Even though there is no liquid/crystallization transformation for a bulk solidifying amorphous metal, a "melting temperature" $T_m$ may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to be such that the time-temperature profile during cooling does not traverse through the nose-shaped region bounding the crystallized region in the TTT diagram of FIG. 2. In FIG. 2, $T_{nose}$ is the critical crystallization temperature $T_x$ where crystallization is most rapid and occurs in the shortest time scale.

The supercooled liquid region, the temperature region between $T_g$ and $T_x$ is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between 1012 Pa s at the glass transition temperature down to 105 Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about $T_x$. Technically, the nose-shaped curve shown in the TTT diagram describes $T_x$ as a function of temperature and time. Thus, regardless of the trajectory that one takes while heating or cooling a metal alloy, when one hits the TTT curve, one has reached $T_x$. In FIG. 2, $T_x$ is shown as a dashed line as $T_x$ can vary from close to $T_m$ to close to $T_g$.

The schematic TTT diagram of FIG. 2 shows processing methods of die casting from at or above $T_m$ to below $T_g$ without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below $T_g$ to below $T_m$ without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above $T_{nose}$ or below $T_{nose}$, up to about $T_m$. If one heats up a piece of amorphous alloy but manages to avoid hitting the TTT curve, you have heated "between $T_g$ and $T_m$", but one would have not reached $T_x$.

Typical differential scanning calorimeter (DSC) heating curves of bulk-solidifying amorphous alloys taken at a heating rate of 20 C/min describe, for the most part, a particular trajectory across the TTT data where one would likely see a $T_g$ at a certain temperature, a $T_x$ when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no $T_x$ upon heating. Another way to think about it is trajectories (2), (3) and (4) can fall anywhere in temperature between the nose of the TTT curve (and even above it) and the $T_g$ line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, C, Si, Ge, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

In the above function, s is the spin quantum number and x is the distance function within the particular system. This function is equal to unity when x=x' and decreases as the distance |x−x'| increases. Typically, it decays exponentially to zero at large distances, and the system is considered to be disordered. If, however, the correlation function decays to a constant value at large |x−x'|, then the system can be said to possess long-range order. If it decays to zero as a power of the distance, then it can be called quasi-long-range order. Note that what constitutes a large value of |x−x'| is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as VITRELOY™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt. %, such as at least about 40 wt. %, such as at least about 50 wt. %, such as at least about 60 wt. %, such as at least about 80 wt. %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One embodiment of the described alloy system is a Zr—Ti—Ni—Cu—Be based amorphous alloy under the trade name VITRELOY™, such as Vitreloy-1 and Vitreloy-101, as fabricated by Liquidmetal Technologies, CA, USA. Some examples of amorphous alloys of the different systems are provided in Table 1 and Table 2.

TABLE 1

Amorphous Alloy Compositions

| Alloy | At. % | At. % | At. % | At. % | At. % | At. % | At. % | At. % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 6 | Pt | Cu | Ag | P | B | Si | | |
| | 74.70% | 1.50% | 0.30% | 18.0% | 4.00% | 1.50% | | |

TABLE 2

Additional Amorphous Alloy Compositions (Atomic %)

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | | |
| | 50.75% | 36.23% | 4.03% | 9.00% | | |
| 8 | Zr | Ti | Cu | Ni | Be | |
| | 46.75% | 8.25% | 7.50% | 10.00% | 27.50% | |
| 9 | Zr | Ti | Ni | Be | | |
| | 21.67% | 43.33% | 7.50% | 27.50% | | |
| 10 | Zr | Ti | Cu | Be | | |
| | 35.00% | 30.00% | 7.50% | 27.50% | | |
| 11 | Zr | Ti | Co | Be | | |
| | 35.00% | 30.00% | 6.00% | 29.00% | | |
| 12 | Zr | Ti | Fe | Be | | |
| | 35.00% | 30.00% | 2.00% | 33.00% | | |
| 13 | Au | Ag | Pd | Cu | Si | |
| | 49.00% | 5.50% | 2.30% | 26.90% | 16.30% | |
| 14 | Au | Ag | Pd | Cu | Si | |
| | 50.90% | 3.00% | 2.30% | 27.80% | 16.00% | |
| 15 | Pt | Cu | Ni | P | | |
| | 57.50% | 14.70% | 5.30% | 22.50% | | |
| 16 | Zr | Ti | Nb | Cu | Be | |
| | 36.60% | 31.40% | 7.00% | 5.90% | 19.10% | |
| 17 | Zr | Ti | Nb | Cu | Be | |
| | 38.30% | 32.90% | 7.30% | 6.20% | 15.30% | |
| 18 | Zr | Ti | Nb | Cu | Be | |
| | 39.60% | 33.90% | 7.60% | 6.40% | 12.50% | |
| 19 | Cu | Ti | Zr | Ni | | |
| | 47.00% | 34.00% | 11.00% | 8.00% | | |
| 20 | Zr | Co | Al | | | |
| | 55.00% | 25.00% | 20.00% | | | |

Other ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the composition $Fe_{48}Cr_{15}Mo_{14}Y_2C_{15}B_6$. They also include the alloy systems described by Fe—Cr—Mo—(Y, Ln)-C—B, Co—Cr—Mo-Ln-C—B, Fe—Mn—Cr—Mo—

(Y, Ln)—C—B, (Fe, Cr, Co)—(Mo, Mn)—(C,B)—Y, Fe—(Co, Ni)—(Zr, Nb, Ta)—(Mo, W)—B, Fe—(Al, Ga)—(P, C, B, Si, Ge), Fe—(Co, Cr, Mo, Ga, Sb)—P—B—C, (Fe, Co)—B—Si—Nb alloys, and Fe—(Cr—Mo)—(C,B)-$T_m$, where Ln denotes a lanthanide element and $T_m$ denotes a transition metal element. Furthermore, the amorphous alloy can also be one of the compositions $Fe_{80}P_{12.5}C_5B_{2.5}$, $Fe_{80}P_{11}C_5B_{2.5}Si_{1.5}$, $Fe_{74.5}Mo_{5.5}P_{12.5}C_5B_{2.5}$, $Fe_{74.5}Mo_{5.5}P_{11}C_5B_{2.5}Si_{1.5}$, $Fe_{70}Mo_5Ni_5P_{12.5}C_5B_{2.5}$, $Fe_{70}Mo_5Ni_5P_{11}C_5B_{2.5}Si_{1.5}$, $Fe_{68}Mo_5Ni_5Cr_2P_{12.5}C_5B_{2.5}$, and $Fe_{68}Mo_5Ni_5Cr_2P_{11}C_5B_{2.5}Si_{1.5}$, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and U.S. Pat. No. 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One composition is $Fe_{72}A_{15}Ga_2P_{11}C_6B_4$. Another example is $Fe_{72}A_{17}Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The described amorphous alloy systems can further include additional elements, such as additional transition metal elements, including Nb, Cr, V, and Co. The additional elements can be present at less than or equal to about 30 wt. %, such as less than or equal to about 20 wt. %, such as less than or equal to about 10 wt. %, such as less than or equal to about 5 wt. %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt. %, such as about 5 wt. %, such as about 2 wt. %, such as about 1 wt. %, such as about 0.5 wt. %, such as about 0.1 wt. %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between $T_g$ and $T_x$, for example. Herein, $T_x$ and $T_g$ are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Amorphous Alloy Manufacturing

Amorphous alloys and bulk amorphous alloys may currently be manufactured by two primary techniques: (1) solidification; and (2) consolidation. Solidification techniques encompass the following: listed arc melting, splat quench, metal injection molding, jet casting, twin-roll casting, die casting, copper mold casting, suction casting and high pressure die casting (HPDC). Consolidation techniques include: hot pressing, warm extrusion, explosive compaction and spark plasma sintering. However, the discussed techniques or processes severely limit manufacturing net-shape components relying upon amorphous metal feedstock.

There have been only a few reports on fabrication of bulk Fe-based alloys using casting. This method has been used because of excellent dimensional accuracy of the finished or final product, smooth cast surfaces as-cast that eliminates or reduces post-machining operations and rapid production rates, among other advantages. Casting includes melting the amorphous alloys and melt injection thereafter into a mold. The molten amorphous alloys injected into the mold are then pressed under a relatively high pressure either mechanically or hydraulically while under a controlled atmosphere. Such conditions allow for the pushing of the molten amorphous alloys into desired mold cavities and complex recessions to produce correspondingly complex shapes with a high degree of accuracy and a fully dense structure. Such die casting as described of amorphous materials is further discussed in various U.S. Patents including U.S. Pat. Nos. 6,021,840 and 6,070,643, both of which are incorporated herein by reference in their respective entireties. In a report, an Fe-based alloy has been cast with an inner diameter of 6 mm and an outer diameter of 10 mm. A reason for the selection of such dimensions is that the Fe-based bulk amorphous alloys may be very brittle. Hence, they are only limited to manufacturing in a laboratory scale and cannot withstand a large scale or volume industrial casting process.

Another technology to manufacture Fe-based bulk metallic alloys is powder metallurgy (PM), a process that includes: pulverization, compaction and sintering. Solid state sintering includes: isostatic pressing, hot isostatic pressing (HIP), shock consolidation, electric current assisted sintering, such as spark plasma sintering, etc. However, this technology involves hot pressing and/or sintering which could deteriorate some of most important properties of the Fe-based bulk metallic alloys including: amorphic state, mechanical properties, and magnetic properties, among others.

Relatively low viscosity at the melting temperature will provide fast and complete filling of intricate portions of a shell/mold with a bulk solidifying amorphous metal for forming the amorphous metallic alloy parts. Engel Global, of Schwertberg, Austria, has developed an injection molding machine capable of processing amorphous metallic alloys. During operation, the amorphous alloy blanks are automatically fed into a melting chamber where the blanks are then melted inductively under high vacuum conditions. The molten metal alloy is injected into a thermo-regulated mold through a piston. Very rapid cooling under exclusion of oxygen leads to the forming of the amorphous structure. The process may be completed in a timeframe that is significantly shorter than PM processes while also including high surface quality as finish with minimal or no need for CNC processing. However, this process does have limitations regarding the maximum size of each part able to be fabricated, as well as regarding the specific dimensions of the parts. For instance, wall thickness of parts produced by the process may vary between 1 and 4 mm and part weight up to 80 g. (P. Hauck: Liquidmetal and Metal Injection Molding: Two complementary metal forming technologies, Powder Injection Molding International 8[3] (2014) 53-61).

High Pressure Die Casting (HPDC) is a much faster technique, compared to other casting techniques, and also offers a high dimensional accuracy and productivity. Ramasamy et al. (P. Ramasamy, A. Szabo, S. Borzel, J. Eckert, M. Stoica, A. Bárdos: High pressure die casting of Fe-based metallic glass, Scientific Reports 6, 2016) studied the effect of HPDC process parameters on microstructural evolution, thermal and magnetic properties of a Fe-based amorphous alloy. They concluded that the quality of the samples is strongly influenced by die material, amorphous alloy temperature during casting and flow rate of the amorphous alloy. Even complex geometries with high dimensional accuracy could be achieved, but undesirable porosity and cracking during solidification limited this method to manufacture amorphous metallic alloy parts.

The viscosity of amorphous alloys at the melting temperature lie in the range of about 0.01 poise to about 10,000 poise, and bulk solidifying alloy can exist as a highly viscous liquid between the melting and glass transition temperature. The process-ability of amorphous alloys in the supercooled liquid region is similar to plastics with strain rates of the order of $0.01$ $s^{-1}$. Hence, Thermoplastic Forming (TPF) has also been used for manufacture Fe-based bulk amorphous alloys. However, a short processing time to avoid crystallization is a major disadvantage of this technology for manufacturing large and complex parts. Further, geometric constraints exist as imposed by reducing the sample size or feature below a critical length scale of 1 mm. Nevertheless, this technology offers near-net shape geometry parts, very good surface finish and the ability to manufacture fine and small complex structures.

All these traditional metal manufacturing/forming methods have proven to be unsuccessful in developing components thicker than 70 mm in case of nonferrous amorphous alloys and thicker than 6 mm in case of ferrous alloys (Table 3). In addition, all these methods were unsuccessful to produce complex geometries, and most importantly due to the cooling limitations of these methods, as it is difficult to suppress completely the phase crystallization resulting on parts that are not fully amorphous.

TABLE 3

Amorphous Alloys Systems and Maximum Part Thicknesses of their Corresponding Bulk Amorphous Alloys

| Ferrous Amorphous Alloys | Maximum Cast Thickness [mm] |
| --- | --- |
| Fe—(Al, Ga)—(P, C, B, Si, Ge) | 3 |
| Fe—(Nb, Mo)—(Al, Ga)—(P, B, Si) | 3 |
| Fe—(Zr, Hf, Nb)—B | 5 |
| Fe—(Co, Ni)—(Zr, Hf, Nb)—B | 6 |
| Fe—(Al, Ga)—(P, C, B, Si) | 3 |
| Fe—(Co, Mo)—(C, B)—Y | 16 |
| Fe—(Cr, Mo)—(C, B, P) | 2.2 |
| Co—(Al, Ga)—(P, B, Si) | 1 |
| Co—(Zr, Hf, Nb)—B | 1 |
| Ni—(Zr, Hf, Nb)—B | 1 |

While amorphous materials offer great promise for different applications, it is difficult to achieve their benefits because of the problems encountered in preparing parts based on the amorphous metallic alloys. However, such problems may be largely avoided by using amorphous alloys in coating related technologies to realize the benefits of the alloys. In such an application, the amorphous alloys are applied as a coating on a surface of a metallic part. Indeed, because of limitations in application thickness, metallic glasses were initially largely limited to applications that involved coatings. Technologies to apply such coatings include: thermal spraying techniques (plasma spraying, arc spraying, high velocity oxygen fuel and high velocity Air Fuel), Physical Vapor Deposition (PVD), electrodeposition, etc. For example, in some thermal spraying techniques, metallic glass in a powdered form of micrometer sized particles is sprayed onto the object to be coated. In other thermal spraying techniques, metallic glass in a wire form is heated to a molten state and thereby applied to the object to be coated. The thermal sprayed coatings are usually rough and require a grinding finishing step to achieve the dimensional accuracy. Thinner coating could be achieved through PVD technique. However, this technique is limited insofar the part size is constrained from the PVD chamber size. In addition, as with all coatings applied as protective layers, if a thin amorphous coating is worn away in a location of the part exposed to particularly severe conditions, the parts may not be protected anymore by the thin amorphous coating. In addition, a localized coating cracking or worn out can grow in lateral extent rapidly, so that adjacent portions of the coating are undermined and the coating flakes away. There is then a very rapid increase in the rate of damage, so that failure of a part thought to be protected can occur catastrophically.

Additive Manufacturing (3D Printing)

Amorphous alloys and bulk amorphous alloys may be used as a feedstock material for advanced manufacturing techniques such as additive manufacturing, an industrial production technology that has developed from advances in 3D printing regarding precision, repeatability and material range. Additive manufacturing, generally, refers to a transformative approach to traditional industrial production that enables the fabrication of parts demonstrating desirable physical properties, including improvements in strength and weight reduction when compared to parts made through conventional manufacturing.

3D printing refers to any one or more of the various processes in which material may be joined, glued, adhered, or otherwise solidified under computer control to create a 3D object, with source/feedstock material being added together (e.g., liquid molecules, or powder grains being fused together), typically in a layer-by-layer manner. Objects printed by 3D printing can now have a very complex shape or geometry and typically are produced based on a digital 3D model or a computer-aided-design (CAD) file.

Although there are several 3D printing processes, all 3D printing processes or production techniques can generally be categorized into the following seven categories: (1) vat photopolymerization; (2) material jetting; (3) binder jetting; (4) powder bed fusion; (5) material extrusion; (6) directed energy deposition; and (7) sheet lamination. Also, fused deposition modeling (FDM) has gained prominence regarding the fabrication of metal parts in the 3D printing industry. In FDM, material is added layer-by-layer, instead of conventional machining which may require material to be removed from an item, or traditional casting and forging processes.

General principles governing additive manufacturing or 3D printing may include the following: (1) modeling; (2) printing; (3) finishing; as well as: (4) multi-material printing. Regarding modeling, 3D printable models may be created with the aid of a CAD package through a 3D scanner, or by a digital camera used with photogrammetry software. Printing often involves a layer-by-layer deposition of material according to computer-aided direction, e.g., building the material in the upward vertical direction after the deposition of an initial base or foundation layer to form a completed item or part. Complex geometries and hollowed-out interior surfaces are feasible with modern methods. Finishing refers to the process of achieving greater accuracy than possible by 3D printing alone by printing a slightly oversized version of the desired object to later remove excess material using a higher-resolution subtractive process. Multi-material printing allows for objects to be composed of complex and heterogenous arrangements of source materials, and may require specific materials being directed to specific voxels, e.g., referring to each of an array of elements of volume that constitute a notional three-dimensional space, inside the object volume.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPAD™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Generic Description of the Embodiments

Amorphous metals are a new class of metal alloy-based materials that have a disordered, non-crystalline, and glassy structure. Amorphous metals may be created when metals or their alloys are: (1) cooled very quickly; or (2) have a unique composition that allows for the bypass of crystallization during solidification of the material. Rapid cooling of metals may be achieved upon exposure or application of metals to a supercooled liquid to reduce the temperature of the metals beneath the melting temperature $T_m$, and by exposure of the metals to an appropriate cooling rate to permit the metals in liquid phase to solidify with an amorphous structure.

Vitrification, e.g., the transformation of a substance into a non-crystalline amorphous solid such as a glass, of an alloy occurs at a glass transition temperature, $T_g$, which is often distinct to each material, and representative of a narrow range of temperatures. Further, high cooling rates above $10^4$ K/sec are typically needed to bypass crystallization of metals. [Source: High Strength Bulk Amorphous Alloys with Low Critical Cooling Rates; Inoue, A.; Materials Transactions, JIM, Vol. 36, No. 7 (1995), pp. 866 to 875]. As a result, amorphous metallic alloys may currently be produced in limited forms such as ribbons, foils, or wires having a dimension of a very small or thin size so heat can be more easily extracted from the metallic alloys fast enough to achieve the necessary cooling rate to produce an amorphous structure. Due to these rigorous production requirements and conditions, amorphous metallic alloy specimens have been generally limited to thicknesses of about less than one hundred micrometers.

The preparation of new amorphous metallic alloys that form amorphous structure below the glass transition temperature at a rate between 100 to 1,000 K/sec are described in U.S. Pat. No. 9,499,891. Earlier, glassy ingots with 5 mm diameter were produced from an alloy having a composition of 55% palladium, 22.5% lead, and 22.5% antimony, by using surface etching followed with several heating-cooling cycles. Using boron oxide flux, the thickness achievable increased to a centimeter. More recently, new alloys have been developed that form an amorphous structure at cooling rates as slow as 1 K/sec. These amorphous alloys can be cast into parts of up to several centimeters in thickness depending on the type of alloy used while continuing to retain an amorphous structure. Optimal glass-forming alloys may be based at least in part on zirconium and palladium, but alloys based on iron, titanium, copper, magnesium, and other metals are also known. These alloys have a high temperature difference between the glass transition temperature and the crystallization temperature. Some of the alloys have a difference between glass transition and crystallization of about less than 70 degrees, thus resulting in limitations encountered during manufacturing of these alloys.

Amorphous alloys often have more than three elements, where the atomic radii of a main element should differ by more than 12% relative to the other elements to ensure a high atomic packing density. Also, a negative mixing heat is desired to increase the viscosity of the alloy in liquid state to hinder atomic migration and thus ensure short-range order. Alloys including many different elements, e.g., a dozen or more, may not be able to arrange their constituent atoms into equilibrium crystalline states upon exposure to cooling at sufficiently fast rates given that movement of the atoms are inhibited. Also, currently available amorphous alloys may be formed by utilizing what is termed as a "confusion effect", which occurs when a material forms a glass instead of undergoing a phase change from liquid to solid during solidification process. However, during quenching process of amorphous metallic alloys, several distinct crystalline nuclei may be formed. Those involved in the fields of materials science, metallurgy, and advanced materials have postulated that this leads to the formation of several clusters which compete with each-other to grow to a critical size required for crystallization but the formed clusters may not always each attain that critical size.

Regardless of challenges associated with their formation, amorphous metals are often desirable in a number of applications due to their unique microstructure, which combines ultra-high strength, high hardness and ductility. They are also more corrosion resistant relative to conventional metals due to the lack of long-range periodicity, related grain boundaries and crystal defects such as dislocations down to the atomic scale. Moreover, they may be stronger than crystalline metals and can sustain larger reversible deformations than crystalline alloys. However, bulk consolidation of these amorphous powders is crucial to maintain amorphous structure.

Various representative amorphous coatings, formulations, and methods of manufacture thereof are disclosed in the following: U.S. Patent Publication No.: 2009/0087677 entitled "Amorphous Aluminum Alloy Coatings" directed to an amorphous aluminum alloy coating, which may include one of cerium, cobalt and/or molybdenum as alloying elements and be applied by a physical vapor deposition process to a desired thickness. The coating may supply improved corrosion resistance to a given environmental condition. A method is provided for forming an amorphous aluminum alloy coating involving: providing a vacuum chamber; providing a substrate for coating; providing a target material comprising aluminum and one or more alloying elements; and, for ejecting particles from said target and depositing an amorphous aluminum alloy coating wherein at least 50% of said alloy is amorphous.

U.S. Patent Publication No.: 2010/0188186 entitled "Soft Magnetic Amorphous Alloy" directed to a soft magnetic amorphous alloy represented by the following composition formula: $\{Fe_a(Si_xB_yP_z)1-a\}_{100-b}L_b$. In the composition formula, L represents one or more elements selected from Al, Cr, Zr, Nb, No, Hf, Ta and W, and a, b, x, y, and z meets the conditions of: $0.7 \leq a \leq 0.82$; $0 \leq b \leq 5$ atomic %; $0.05 \leq x \leq 0.6$; $0.1 \leq y \leq 0.85$; $0.05 \leq z \leq 0.7$; and $x+y+z=1$. The disclosed alloy composition is formed efficiently, and demonstrates a soft magnetic property, having a high saturation magnetic flux density and a high corrosion resistance, and can be manufactured at low cost. Moreover, a dust core, an inductor, a ribbon, a piece, and a bulk member using the soft magnetic amorphous alloy of the present invention can be provided. Further, by using the above-mentioned materials, a magnetic material such as, for example, an inductance element, a magnetic head and a magnetic recording medium as well as a magnetic core of the inductor can be provided.

U.S. Patent Publication No.: 2010/0139814 entitled "Amorphous Alloy Composition" directed to an amorphous alloy has a specific composition of $Fe_aB_bSi_cP_xCu_y$. Here, the values a-c, x, and y meet such conditions that 73 at %≤a≤85 at %, 9.65 at %≤b≤22 at %, 9.65 at %≤b+c≤24.75 at %, 0.25 at %≤x≤5 at %, 0 at %≤y≤0.35 at %, and 0≤y/x≤0.5. The disclosed amorphous alloy composition has a high saturation magnetic flux density and can provide an increase in thickness. Further, an occupancy ratio of a magnetic member is increased by reduction in the number of layers, the number of turns, or gaps between layers. Accordingly, an effective saturation magnetic flux density is increased. Additionally, an amorphous alloy composition according to the present invention has a high Fe content. The saturation magnetic flux density is increased in this point of view as well.

U.S. Patent Publication No.: 2011/0162795 entitled "Amorphous Alloy Bonding" directed to a method of forming an interfacial layer or a seal. The method involves: providing a composition that is at least partially amorphous, the composition having a glass transition temperature $T_g$ and a crystallization temperature $T_x$; heating the composition to a first temperature that is below $T_x$; disposing the heated composition to form the interfacial layer or the seal; and cooling the interfacial layer or the seal to a second temperature that is below $T_g$. Specifically, methods of forming an interfacial layer or seal having amorphous alloys or composites within the supercooled liquid region or around the glass transition temperature of the amorphous alloys are provided. Also provided herein include articles that comprise an interfacial layer made of, or having, the amorphous alloys or composites, the interfacial layer being used as a bonding element to bond at least two parts. Another embodiment provides a seal made of, or having, the amorphous alloys or composites, the seal being used to create an effectively air-tight and/or water-proof seal over a part. The seal can be over the surface of the part on the exterior surface and/or interior surface, particularly when the surface has a recessed surface, such as a cavity or undercut.

U.S. Patent Publication No.: 2012/0024431 entitled "Amorphous Alloy" directed to an amorphous alloy and a method for manufacturing thereof. The amorphous alloy has a chemical formula of $Ni_{100-a-b-c-d-e-f}Nb_aZr_bTi_cTa_dM_eI_f$, wherein the M is at least one selected from a group of Sn and Si, wherein the I is at least one selected from a group of C and O, and wherein the a, b, c, d, e, and f are satisfied with the compositions of 10.0 wt %≤a≤25.0 wt %, 5.0 wt %≤b≤25.0 wt %, 5.0 wt %≤c≤10.0 wt %, 0.0 wt %≤d≤25.0 wt %, 0.0 wt %≤e≤6.5 wt %, 0.0 wt %≤f≤0.5 wt %, respectively. The disclosed amorphous alloy demonstrates high strength and desirable corrosion resistance. In an embodiment, an oxide film may be formed on a surface of the amorphous alloy, and the oxide film may include N.

U.S. Patent Publication No.: 2013/0037177 entitles "Aluminum-and-Amorphous Alloy Composite and Method for Manufacturing" directed to an aluminum-and-amorphous alloy composite includes an aluminum part and an amorphous alloy part. The aluminum part has an aluminum oxide film formed on a surface thereof. The aluminum oxide film defines nano-pores. The amorphous alloy part is integrally bonded to the surface of the aluminum part having the aluminum oxide film. A method for manufacturing the composite is also described. In an embodiment, a method of making an aluminum-and-amorphous alloy composite involves: providing an aluminum part; anodizing the aluminum part to form an aluminum oxide film defining nano-pores; pre-heating the aluminum part; positioning the aluminum part in a mold; and molding molten amorphous alloy on the aluminum oxide film to form an amorphous alloy part integrally bonded to the aluminum part when hardened, the molten amorphous alloy being at a temperature of about $(T_g+5°)$ C. to about $(T_x-10°)$ C., wherein the $T_g$ and $T_x$ are the onset temperature of glass transition and the onset temperature of crystallization of the amorphous alloy respectively.

U.S. Patent Publication No.: 2014/0345754 entitled "Molding and Separating of Bulk-Solidifying Amorphous Alloys and Composite Containing Amorphous Alloys" directed to a method to form and to separate bulk solidifying amorphous alloy or composite containing amorphous alloy. The forming and separating takes place at a temperature around the glass transition temperature or within the super cooled liquid region are provided. The method involves: processing a metal alloy to form a bulk solidifying amorphous alloy part, wherein the processing is performed in a manner such that a time-temperature profile during the processing does not traverse through a region bounding a crystalline region in a time-temperature-transformation (TTT) diagram of the metal alloy, and cutting a portion of the bulk solidifying amorphous alloy part by a cutting tool that is heated to a temperature greater than a glass transition temperature ($T_g$) of the metal alloy without previously cooling the bulk solidifying amorphous alloy part to a temperature near room temperature.

U.S. Patent Publication No.: 2014/0193662 entitled "Stainless Steel-and-Amorphous Alloy Composite and Method for Manufacturing" directed to a stainless steel-and-amorphous alloy composite includes a stainless-steel part and an amorphous alloy part. The stainless-steel part has nano-pores defined in a surface thereof. The amorphous alloy part is integrally bonded to the surface having the nano-pores. A method for manufacturing the composite is also described.

U.S. Patent Publication No.: 2016/0177430 entitled "Z-Group Amorphous Alloy Composition" directed to a highly corrosion-resistant Zr-group amorphous alloy composition. According to one, provided is the Zr-group amorphous alloy composition comprising: 67-78 atomic percent of Zr; 4-13 atomic percent of Al and/or Co; 15-24 atomic percent of Cu and/or Ni, wherein glass forming ability of the Zr-group amorphous alloy composition is at least 0.5 mm. The disclosed Zr-group amorphous alloy composition provides a highly corrosion-resistant Zr-group amorphous alloy composition containing a higher Zr content compared to existing amorphous alloys, and has only commercial metal elements, and therefore has superior industrial and economic utility and is easily rendered practical.

U.S. Patent Publication No.: 2016/0298219 entitled "Imprinting Bulk Amorphous Alloys at Room Temperature" directed to a technique for straining an amorphous alloy at ambient temperature to plastically and homogeneously deform the amorphous alloy, such that at least an exterior surface of the deformed amorphous alloy is substantially free of shear bands. An amorphous alloy may be strained at a rate of less than about $9 \times 10^{-5}$ s$^{-1}$ or by multiple passes of cold rolling. A pattern from a die may be imprinted into the amorphous alloy when strained, and the amorphous alloy may be used as a die to plastically strain other materials. In other examples, an amorphous alloy may be cold rolled in a plurality of passes to reduce the thickness of the amorphous alloy, e.g., by between about 0.1% and about 1% each pass, to imprint a particular shape in the amorphous alloy. A first die having sufficient yield strength may be utilized in straining and imparting one or more cavities (e.g., a rectangular pattern) in the amorphous alloy. The disclosed techniques may be applied to various types of amorphous alloys, such as metallic glasses with glass transitions or amorphous alloys without glass transitions. U.S. Patent Publication No.: 2017/0152586 entitled "Au-Base Bulk Solidifying Amorphous Alloys" directed to compositions for forming Au-based bulk-solidifying amorphous alloys. The Au-based bulk-solidifying amorphous alloys are based on ternary Au—Cu—Si alloys, and the extension of this ternary system to higher order alloys by the addition of one or more alloying elements. Additional substitute elements are also provided, which allow for the tailoring of the physical properties of the Au-base bulk-solidifying amorphous alloys. In an embodiment, a bulk-solidifying amorphous alloy comprising Au from 25 to 75 atomic percent, Cu from 13 to 45 atomic percent, and Si from 12 to 30 atomic percent is disclosed. In an embodiment, a bulk-solidifying amorphous alloy comprising Au, Cu and Si is disclosed. The article has a minimum thickness of about 1 mm and has at least 50% amorphous content by volume, wherein the bulk-solidifying amorphous alloy has greater than 0% atomic percent to 17% atomic percent of Si, wherein said Au, said Cu and said Si are distributed substantially throughout the article.

Although amorphous materials offer great promise for various applications, difficulties currently exist regarding extracting their full benefit because of challenges encountered in preparing amorphous metallic alloy parts. However, such drawbacks can be overcome through the production of bulk amorphous alloys by using additive manufacturing (AM). AM processes are typically designed to manufacture parts with high dimensional accuracy and quality. A number of scientists have reported AM of amorphous alloys. For instance, U.S. Pat. No. 8,333,922 discusses a method of producing three-dimensional bodies, which wholly or for selected parts consist of a composite of crystalline or nanocrystalline metal particles in a matrix of amorphous metal. Alloys described in this patent are titanium-based, zirconium-based and copper-based alloys. In addition, iron-based alloys including Fe—Ga—(Cr,Mo)—(P,C,B), Fe—C-Ln-B, Fe—B—Si—Nb, Fe—Ga—(P,B), Fe—(Al,Ga)—(P,C,B,Si, Ge) are also included.

Other manufacturing techniques relating to the fabrication of objects includes U.S. Patent Publication No. 2009/0263582, which relates to a method for building a three-dimensional object in a layer-by-layer manner with a digital manufacturing system. The method includes heating a build chamber of the digital manufacturing system and feeding a solid feedstock of an amorphous alloy material to a liquefier assembly of the digital manufacturing system. The method further includes heating the material of the solid feedstock in the liquefier assembly to an extrudable state and depositing the heated material within the heated build chamber in a predetermined pattern to form the three-dimensional object. The method involves amorphous metallic alloys with a glass transition temperature less than 450° C. and a temperature difference between melting temperature and glass transition temperature of at least 20° C. The feedstock in this prior art is an Ce-based alloy that compromises cerium, copper, aluminum, and niobium.

U.S. Pat. No. 9,044,805 describes a method of selectively depositing molten metallic glass and forming a solid layer-by-layer construction manufacturing a composite part where at least some layers could be amorphous metallic alloys. The deposition can be repeated as needed layer-by-layer. Likewise, CN104117672 relates to a process for preparing and/or forming amorphous alloy and a composite material of the amorphous alloy using selective laser melting (SLM) technology. The metal powder used in this method are nickel, zirconium, palladium, magnesium, cobalt or rare earth based amorphous systems.

DE102014018080 A1 relates to an additive method named Selective Amorphous Metal Extrusion (SAME) for producing amorphous, crystalline and/or semi-crystalline structure of Zr-, Ce- or Au-based metal parts. Further, US2013/0309121 A1 describes additive manufacturing methods of part using bulk metallic glasses layer-by-layer. The heating source was either laser or electron beam and the amorphous feedstock has a particle size of 100 microns to 1 mm. Alloys described in this patent include zirconium-based, titanium-based, platinum-based, palladium-based, silver-based, copper-based, nickel-based, molybdenum-based, gold-based, aluminum-based and the like. In addition, two Fe-based alloys with 68 at. % Fe, 5 at. % Mo, 2 at. % Cr, and additions of phosphor, carbon, boron and silicon.

Currently, additive manufacturing of iron-based amorphous alloys is concentrated on compositions with at least 60 at. % iron with additions of less than 15 at. % chromium, boron, carbon, phosphorous, and silicon. [Source: Pauly et al. (Processing metallic glasses by selective laser melting, Mater. Today 16 [1] (2013) 37-41) reported on the fabrication of Fe-based BMG by selective laser melting]. By using an optimum laser energy density, metals and/or metal alloys were melted, rapidly solidified and built in a 3-dimensional structure. The selective laser melting (SLM) specimens prepared were partially crystalline and displayed a high density of process induced cracks. Soft magnetic Fe-based bulk metallic glass cylindrical specimens have successfully fabricated with a diameter of 2 mm and height of 6 mm by selective laser melting (SLM) of $Fe_{68.3}C_{6.9}Si_{2.5}B_{6.7}P_{8.7}Cr_{2.3}Mo_{2.5}Al_{2.1}$. [Source: Jung et al. (Fabrication of Fe-based bulk metallic glass by selective laser melting: a parameter study, Materials and Design, 86 (2015) 703-708)]. The quality of the SLM specimens was strongly influenced by the scan speed and the laser power, while the specimens still contained micro-pores and cracks.

A proposed solution according to embodiments herein is to provide for the formation of an amorphous structure during solidification of metallic amorphous liquids, which is a competing process between solidification of amorphous and crystalline phases, by preparing an iron-based amorphous alloy composition having oxygen impurities in low concentration levels to optimize glass forming ability (GFA). In accordance with one embodiment, there is provided an amorphous alloy composition having iron, chromium, molybdenum, carbon and boron. The composition is defined by a formula of $Fe_{100-(a+b+c+d)}Cr_aMo_bC_cB_d$, wherein a, b, c and d represent an atomic percentage. "a" may be in the range of 10 at. % to 35 at. %; "b" may be in the range of 10 at. % to 20 at. %; "c" may be in the range of 2 at. % to 5 at. %; and "d" may be in the balance of 0.5% at. % to 3.5 at. %.

The composition may be used for additive manufacturing, be provided in powder form, and have an oxygen content of less than 0.2 at. %. The amorphous metallic material may be deposited layer-by-layer by additive manufacturing to produce multifunctional parts with ultra-high strength, without sacrificing toughness, to show superior corrosion and wear resistance on account of the amorphous structure of the metallic material. The amorphous material may be built layer-by-layer by using different additive manufacturing techniques including (but not limited to) laser additive manufacturing, electron beam additive manufacturing and ultrasonic additive manufacturing. Phase transformation or surface modification to obtain beneficial effects regarding mechanical properties due to stress-activated reversible phase transformation may also be provided.

In accordance with an embodiment, additive manufacturing techniques to maintain amorphous structure of metal alloy materials during and after manufacturing process are provided. Two different processes are provided: (1) the complete melting of amorphous powder and the re-solidifying thereof to an amorphous structure to eliminate the formation of a crystalline structure therein by controlling a heating source power and cooling rate without affecting previously deposited layers; and, (2) the partial melting of the outer surface of powder, and solidifying powder particles with each other without undergoing a melting stage.

In accordance with another embodiment, there is provided a method for producing a metallic alloy specimen, the method involving melting at least partially amorphous feedstock having a composition of iron, chromium, molybdenum, carbon and boron, the composition being presented by a formula of $Fe_{100-(a+b+c+d)}Cr_aMo_bC_cB_d$, "a", "b", "c" and "d" representing an atomic percentage; and, re-solidifying the at least partially molten amorphous feedstock to eliminate formation of a crystalline structure therein by controlling a heating source power and cooling rate without affecting previously deposited at least partially molten amorphous feedstock layers. The heating source may be selected from the following: a laser, an electron beam, a plasma, an arc, and an infrared source. The feedstock may be provided in powder or wire form.

Additive manufacturing techniques may be used to manufacture parts using the feedstock to keep the amorphous structure of said materials during and after manufacturing processes. Suitable manufacturing techniques also include the partial melting of the outer surface of powder, and solidifying powder particles with each other without progressing through a melting stage.

In accordance with another embodiment, there is provided a method for manufacturing a metallic alloy specimen, the method involving mixing a powder material having a composition of iron, chromium, molybdenum, carbon and boron, the composition being defined by a formula of $Fe_{100-(a+b+c+d)}Cr_aMo_bC_cB_d$, "a", "b", "c" and "d" representing an atomic percentage, with a liquid binding agent to form a mix; and, depositing a layer of the mix to a selected area. The method also may include applying another layer of the mix to bind to the previously deposited layer, and repeating application of additional layers of the mix to complete manufacturing the metallic alloy specimen. The method may further include incinerating the binding agent, melting the powder material to produce a molten alloy, and infiltrating the molten alloy into the metallic alloy specimen, the metallic alloy specimen having a defined porosity for receiving the molten alloy.

Embodiments

Materials for Additive Manufacturing

Generally, embodiments of the present disclosure relate to materials suitable for use in additive manufacturing techniques and processes. As introduced earlier, additive manufacturing, refers to the developments in traditional industrial production to enable the fabrication of parts having optimal physical properties, including improvements in strength and weight reduction when compared to parts made through conventional manufacturing.

3D printing, a type of additive manufacturing, refers to any one or more of the various processes in which material may be joined, glued, adhered, or otherwise solidified under computer control to create a 3D object, with source/feedstock material being added typically in a layer-by-layer manner. Objects printed by 3D printing can now have a very complex shape or geometry and typically are produced based on a digital 3D model or a computer-aided-design (CAD) file.

Regarding feedstock suitable of application and use in additive manufacturing, "[a]lthough thermoplastics drew the most attention in the early days of 3D printing, material options continue to grow. Additive manufacturing now uses materials like metals, ceramics, glass, composites, graphene-embedded plastics, paper, concrete, food, yarn and even bio-inks. The latter substance is used to create artificial organs and various soft tissues." Advancements in additive manufacturing and materials used therefor include addressing challenges associated with achieving high melting points, specific layer thicknesses, print speed and overall production capacity.

Earlier, the usage of metals in additive manufacturing applications may have been considered to have been a reach considering the limitations of earlier technologies and additive manufacturing equipment. Now, metals may be used, and metal powder and wire feedstock are both materials commonly used in additive manufacturing, depending on the exact type of process used. A variety of metals are available for use, typically in powder form, inclusive of titanium, titanium alloys, steel, stainless steel, aluminum, copper alloys and various superalloys (defined as alloys capable of withstanding high temperatures, high stresses, and often highly oxidizing atmospheres). Wire feedstock options are even more comprehensive, including: steel, stainless steel alloys, and pure metals such as titanium, tantalum, tungsten, niobium, molybdenum and aluminum.

"Metals are either sintered or fully melted to create everything from specialized components to rapid prototypes to jewelry. With sintering, metal powder is partially melted to allow the particles to fuse to one another. Versatile direct metal laser sintering (DMLS) partially melts many different metals and alloys, yielding objects with a degree of porosity."

Alternatively, "electron beam melting (EBM) uses powerful beams of electrons to fully melt various powdered metals, including titanium, steel and stainless steel. EBM is popular where porosity must be minimized, such as in high-stress, high-temperature aerospace applications."

Outside of metals, "[v]arious thermoplastic polymers have been used in 3D printing for decades. Filaments known by their acronyms (like ABS, PLA and PVA) are integral to the production of a wide variety of parts serving numerous industries. Potential AM applications using thermoplastics are expanding as researchers discover ways to strengthen objects along the z axis. Typically, fused filament fabrication demonstrates better strength along the x and y axes than the z axis. Now, research into thermal welding techniques provides a way to provide the all-important "z strength" vital in products like load-bearing prosthetics."

Also, "[c]eramic and glass are increasingly used in additive manufacturing as researchers solve the challenges of working with materials at very high temperatures. The prospect of creating geometrically complex ceramic and glass parts attracts those in disciplines as disparate as aerospace and art."

Amorphous Metals—Generally

Of the type of materials presented and discussed above regarding potential application and usage in additive manufacturing, metals, and more specifically amorphous metals, possess unique physical properties making their usage in additive manufacturing particularly desirable. Generally, an amorphous metal is a solid metallic material, often an alloy, having a disordered atomic-scale structure. While many metals are crystalline in their solid state (e.g., indicating a highly-ordered arrangements of atoms), amorphous metals are non-crystalline and have a glass-like structure. However, unlike common glasses, which are typically electrical insulators, amorphous metals have good electrical conductivity. Amorphous metals may be produced by several methods, including the following: extremely rapid cooling, physical vapor deposition ("PVD"), solid-state reaction, iron irradiation, and mechanical alloying. [Source: "Connectivity and glass transition in disordered oxide systems"; Ojovan, M. I.; Lee, W. B. E. (2010); Journal of Non-Crystalline Solids. 356 (44-49): 2534.]

Earlier, small batches of amorphous metals have been produced via a variety of rapid cooling methods, including sputtering molten metal onto a spinning metal disk (referred to as "melt spinning"). The rapid cooling, on the order of millions of degrees C. per second, is too fast for crystallization to occur and the material is "locked" or "frozen" into a glassy state. Recently, alloys with critical cooling rates low enough to permit formation of amorphous structure in thicker layers (e.g., over 1 millimeter) have been made; these are referred to as bulk metallic glasses ("BMG").

Physical Properties of Amorphous Metals Used in Additive Manufacturing

Amorphous metal is typically an alloy, rather than a pure metal (defined herein as not being joined with any other metal or synthetic metal). Alloys, defined herein as a metal made by combining two or more metallic elements (to give greater strength or resistance to corrosion) contain atoms of significantly different size that leads to reduced free volume, and thus considerably higher viscosity than other metals and alloys, in a molten state. The increased viscosity of molten amorphous metal prevents its atoms from moving around enough to create an ordered lattice. Also, the material structure of an amorphous metal also results in reduced shrinkage during cooling, and resistance to plastic deformation. The absence of grain boundaries (defined herein as the interface between two grains, or crystallites, in a polycrystalline material; grain boundaries are 2D defects in a crystal structure and tend to decrease the electrical and thermal conductivity of the material), the weak areas of crystalline materials, provides improved resistance to wear and corrosion. [Source: "Microhardness and abrasive wear resistance of metallic glasses and nanostructured composite materials"; Gloriant, Thierry (2003); Journal of Non-Crystalline Solids. 316 (1): 96-103]. Also, amorphous metals, while classified as being glasses, are also considerably tougher and less brittle than oxide-based glasses and ceramics. And, "[t]hermal conductivity of amorphous materials is lower than that of crystalline metal. As formation of amorphous structure relies on fast cooling, this limits the maximum achievable thickness of amorphous structures."

To attain formation of an amorphous structure with relatively slower cooling (than $10^4$K/sec as introduced earlier), amorphous alloys may need to be produced with at least three components. Doing so leads to the formation of complex crystal units with a higher potential energy and a lower chance of formation. [Source: Bulk Metallic Glasses. C. Suryanarayana and A. Inoue, (2011); CRC Press: Boca Raton, Fla.]. Further, variation between the atomic radii of the components may need to be significantly different, e.g., varying over 12%, to achieve desirable high packing density and low free volume. Also, the combination of components should have a negative heat of mixing, preventing against crystal nucleation and extending the duration in which molten metal remains in a supercooled state.

Generally, amorphous metals tend to have higher tensile yield strengths and higher elastic strain limits than polycrystalline metal alloys. However, their ductilities and fatigue strengths are lower. [Source: Structure-Property Relations in Nonferrous Metals; Russell, Alan & Lee, Kok Loong (2005); John Wiley & Sons. p. 92]. Amorphous alloys have many unique and useful properties suitable for additive manufacturing applications. Specifically, they tend to be stronger than crystalline alloys having similar chemical compositions, and can also sustain larger reversible (e.g., "elastic") deformations than crystalline alloys. Amorphous alloys derive such strength from their non-crystalline structure, which does not include any of the defects (such as dislocations, defined in materials science generally and herein as an irregularity in a crystal structure, where the presence of such dislocations influences the properties of the materials) that may limit the strength of crystalline allows.

Useful properties of bulk amorphous alloys derive from their glassy-like structure, meaning that they soften and flow upon heating, allowing for convenient processing by, for example, injection molding, in a manner like polymers. Resultantly, amorphous alloys have been commercialized in a number of fields, including sports equipment [Source: "Amorphous Alloy Surpasses Steel and Titanium"]. Also, thin films of amorphous coatings may be deposited, via high velocity oxygen fuel (defined herein as referring to a class of thermal spray processes where a mixture of gaseous or liquid fuel and oxygen is fed into a combustion chamber, where they are both ignited and combusted continuously) as protective coatings to, e.g., protect coated surfaces from exposure to harsh environmental conditions.

Alloys—Generally; Microstructural Stabilization Via Alloying

As defined generally understood in the art and defined herein, an alloy refers to a combination of metals and/or of a metal and another element. Alloys are defined by a metallic bonding character. [Source: "Materials Science and Engineering: An Introduction"; Callister, W. D., 2007, 7th edition, John Wiley and Sons, Inc. New York, Section 4.3 and Chapter 9]. An alloy may be a solid solution of metal elements (a single phase) or a mixture of metallic phases (two or more solutions). Alloys find use in a wide variety of applications. Metal alloys may benefit from the synergistic properties of the individual constituent elements, e.g., corrosion resistance and/or mechanical strength.

Alloying of a metal may be accomplished by combining it with one or more different elements. Traditional known alloying processes include heating the base metal beyond its melting point to then dissolve solutes into the molten liquid, which may be possible even in situations where the melting of the solute is greater than that of the base alone. Further, "[b]y adding another element to a metal, differences in the size of the atoms create internal stresses in the lattice of the metallic crystals; stresses that often enhance its properties. For example, the combination of carbon with iron produces steel, which is stronger than iron, its primary element." Also, "[t]he physical properties, such as density, reactivity, Young's modulus of an alloy may not differ greatly from those of its base element, but engineering properties such as tensile strength, ductility, and shear strength may be substantially different from those of the constituent materials. This is sometimes a result of the sizes of the atoms in the alloy, because larger atoms exert a compressive force on neighboring atoms, and smaller atoms exert a tensile force on their neighbors, helping the alloy resist deformation. Sometimes alloys may exhibit marked differences in behavior even when small amounts of one element are present." [Source: Materials of Construction: Their Manufacture and Properties; Mills, Adelbert Phillo (1922); John Wiley & Sons, Inc.].

Traditional metal alloys may feature a crystalline microstructure and can achieve a specific property like strength or hardness by post processing. In the context of amorphous metals, alloying provides a complete solution regarding optimization of desirable physical properties based on individual constituent elements as well as the various discussed physical properties of amorphous materials and metals generally, e.g., improved strength and durability.

Theory Regarding the Formation of Amorphous Metals

Amorphous alloys are created when feedstock metals or their alloys bypass the stages of: (1) nucleation; and (2) growth of crystalline phases during solidification. This is accomplished either by rapid cooling or due to the alloy having a unique composition. FIG. 2 shows the time-temperature-transformation (TTT) solidifying diagram of a bulk amorphous and a crystalline alloy. The "C"-type shape of crystalline materials in the TTT diagram is the result of the competition between the increasing driving force for crystallization and the slowing of kinetics (effective diffusivity) of the atoms. Both thermodynamic and kinetic parameters affect the crystallization and shift the "C"-type shape position to larger times.

The position of the nose (e.g., $T_{nose}$) determines the critical cooling rate to avoid nucleation and crystal growth during cooling and defines the conditions or parameters required to manufacture amorphous alloys. In the case of amorphous alloys, instead of undergoing a liquid-to-solid crystallization transformation, molten feedstock material becomes more viscous as the temperature reduces near to the glass transformation temperature and transforms to a solid state upon being reduced beyond this temperature. In the liquid state, the atoms vibrate around positions and have no long-range ordering. Hence, the critical cooling rate is determined by atomic fluctuations, controlled by thermodynamic factors, rather than kinetic factors.

The glass-forming ability of metallic glasses may be increased with the controlled addition of certain elements in limited amounts (e.g., microalloying). Doing so can increase the thermal stability of metallic glasses by suppressing precipitation of crystalline phases. Specifically, adding elements may also create or add to strain at a localized atomic level, where a difference in atomic sizes between elements is needed to create strain within the lattice such that when the strain reaches a critical value the structure of the alloy decomposes to become amorphous. This also helps in random packing, which suppress the atomic rearrangement and decreases atomic diffusivity and hence also the viscosity of the material.

Amorphous alloys may show prominent characteristics of liquid phase feedstock material, including the absence of a typical long-range ordered pattern often found in the atomic structure of crystalline alloys, as well as any defects associated with such a structure, on account of bypassing the crystallization phase entirely. One class of amorphous metallic alloy contains mid-sized element as the majority element, such as at a level of 60-70 at. %. The minority elements are small-sized elements compromising 20-30 at. %, and large-sized elements comprise up to 10 at. %. This class of amorphous alloys is termed "majority atom-small atom-large atom" or MSL class. Due to the large negative heats of mixing between large and small elements, they tend to be strongly attracted towards each-other rather than to mid-sized elements. Hence, such a process or phenomenon may produce random pairs of large and small atoms distributed throughout the amorphous matrix.

This random nature makes amorphous metallic alloys free from the typical defects that are encountered in crystalline structures including dislocations and grain boundaries. Such a disordered, dense atomic arrangement and the absence of crystal slip systems determines the unique structural and functional properties of amorphous alloys. Amorphous metals are also more corrosion resistant compared to conventional metals due to the lack of long-range periodicity, related grain boundaries and crystal defects such as dislocations. In addition, they are stronger than crystalline metals and they can sustain larger reversible deformations than crystalline alloys. Due to their unique microstructure, amorphous metals combine the desirable physical properties of ultra-high strength, high hardness and ductility in a single material.

Many Fe-based bulk metallic glasses ("BMGs") have been developed since the first Fe-based amorphous alloys synthesized in 1995 and have attracted a great deal of attention due to their superior properties, such as high strength, high corrosion resistance and low material cost. [Source: A. Inoue, J. S. Gook. Fe-based ferromagnetic glassy alloys with wide supercooled liquid region. Mater. Trans., JIM 36 (1995) 1180-1183; A. Inoue., J. S. Gook. Multicomponent Fe-based glassy alloys with wide supercooled liquid region. Mater. Trans., JIM 36 (1995) 1282-1285.] However, large-scale manufacturing of the Fe-based amorphous alloys remains a challenging issue, not being fully resolved by currently available methods.

Iron-Based Amorphous Metal Alloys; Composition(s) Thereof

The disclosed embodiments provide an iron-based amorphous metallic alloy composition and structure that combines ultra-high strength, moderate density and high hardness. The alloy composition does so without sacrificing toughness and further also provides superior corrosion and wear resistance in a single amorphous structure with specifications typically required for additive manufacturing.

Figure 3:
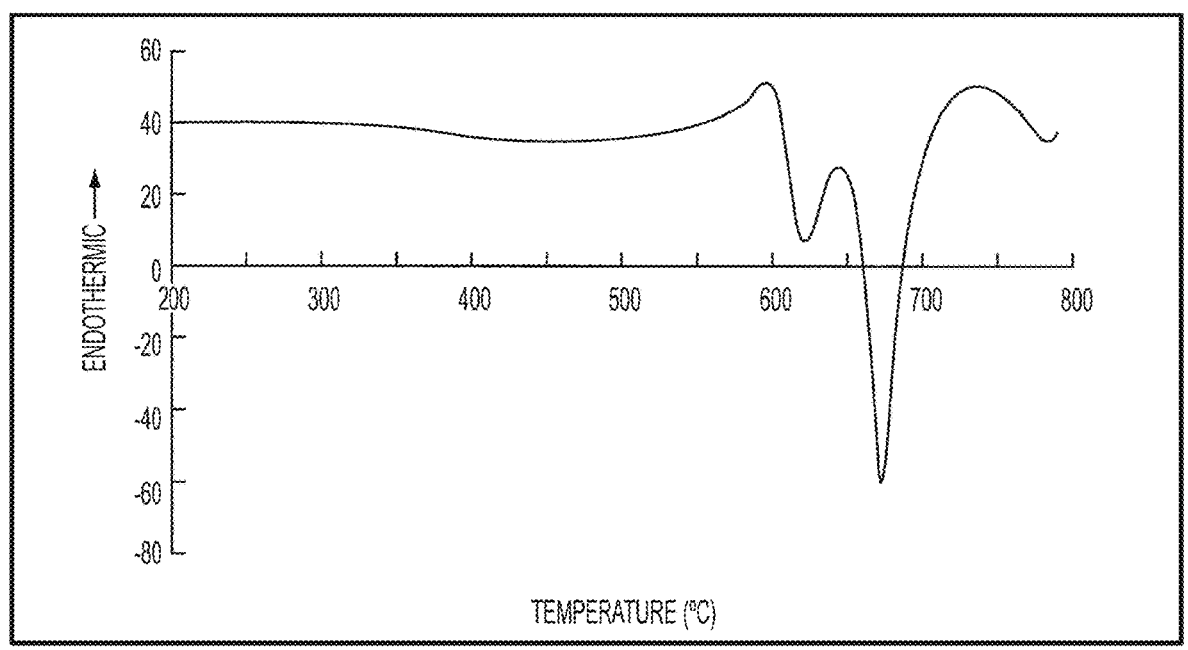
FIG. 3 is a differential scanning calorimetry ("DSC") analysis of an amorphous powder.

Disclosed materials comprise amorphous Fe-based alloys, containing Cr, C, B, Mo, etc., in specific, pre-determined ratios and/or quantities. FIG. 3 shows a differential scanning calorimetry ("DSC") analysis of an example amorphous powder.

Figure 4A:
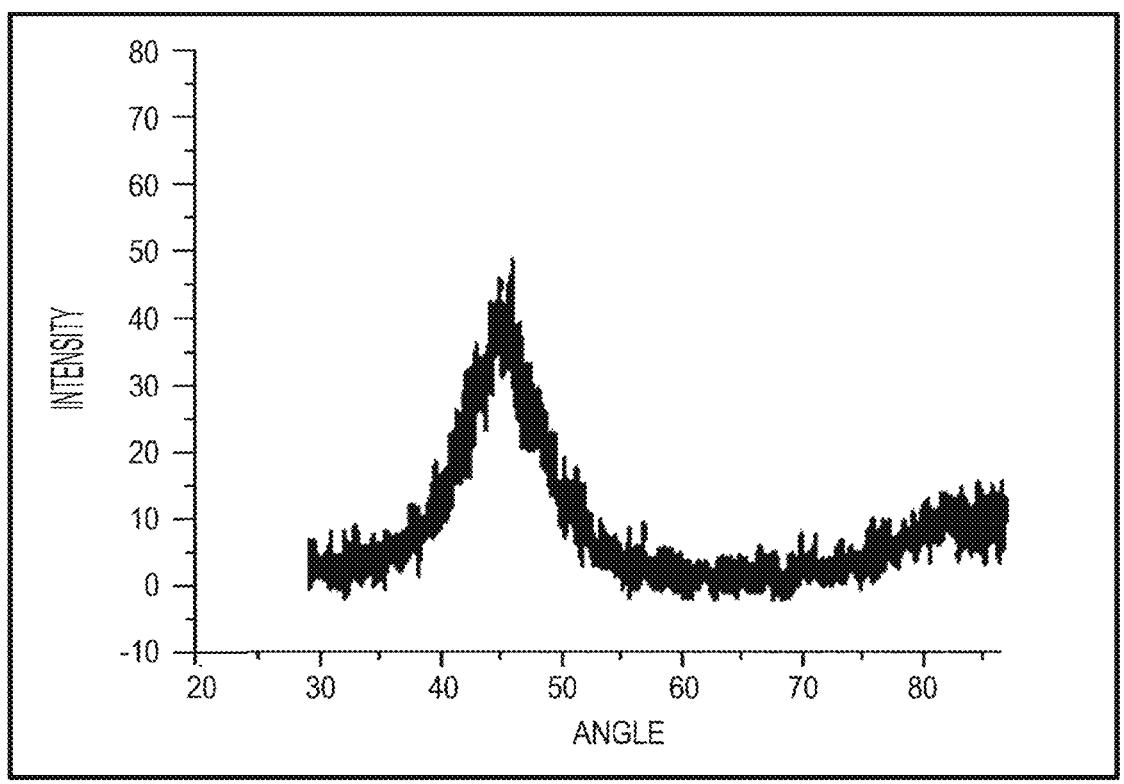
FIG. 4A is an X-Ray Diffraction ("XRD") of an amorphous powder.

In an embodiment, the chemical composition of the amorphous material is provided as shown in FIG. 4A depicting an X-ray diffraction ("XRD") of the amorphous material in powder form. Specifically, a family of transformable alloys have the chemical formula of: $Fe_{100-(a+b+c+d)}(Cr_aX_bY_cZ_d)$, where "a" is in the range of 10 to 50 at. %; "b" is in the range of 10 to 30 at. %; "c" is in the range of 2 to 10 at. %; and "d" is in the range of 0.5 to 10 at. %. The Y component may be selected from the group consisting of boron, carbon and combinations thereof, while the X and Z components may be selected from the group consisting molybdenum, copper, cobalt, aluminum, titanium, tungsten, niobium, silicon, vanadium, and combinations thereof.

Amorphous metallic alloys possess unique properties; however, many may demonstrate low fracture toughness and poor ductility (less than 0.5%), both properties which ultimately limit the versatility of their potential applications. Usually, plasticity of amorphous metallic alloys may be improved by a heterogeneous structure due to shear formation, and effectively impeding the propagation thereof. Also, increasing fracture toughness and ductility may involve the additional usage of microstructural stabilization methods that prevent shear bands from lengthening and promote the formation of multiple shear bands. Such a method is alloying. General governing concepts for the selection of metallic and metalloid elements include for the adjustment of the composition closer to a eutectic temperature and/or point for the involved component species, e.g., collectively referred to as the "system", by lowering the liquidus temperature, thus enabling liquid melts to obtain and/or undergo large undercooling.

Carbon and boron are both significant elements in the formation of amorphous iron-based systems, since they have relatively large negative mixing enthalpy values (Fe—B=−26 kJ/mol, Cr—B=−31 kJ/mol, Mo—B=−34 kJ/mol and Fe—C=−50 kJ/mol, Cr—C=−61 kJ/mol, Mo—C=−67 kJ/mol. [Source: Takeuchi A, Inoue A. Classification of Bulk Metallic Glasses by Atomic Size Difference, Heat of Mixing and Period of Constituent Elements and its Application to Characterization of the Main Alloying Element. Mater T JIM. 12[46] (2005) 2817-2829).] Due to large atomic differences, a strong backbone structure is formed that reduces atomic re-arrangements, in turn leading to a decrease in atomic diffusivity by improving the stability of the melt and suppressing crystallization. In addition, it should be noted that boron can enhance the glass-forming-ability (GFA) of the iron-based amorphous alloys due to: (1) a decrease the safe gap between primary and secondary crystallization peaks; and (2) an increase in the probability of the Fe—B compound formation.

However, high boron content increases the tendency for the formation of crystalline compounds having high melting temperature, as this outcome is thermodynamically favored. Formation of such crystalline compounds thus reduces the toughness of the BMG alloys. Accordingly, desirable quantities of Boron are typically kept at below 10 at. %. For example, boron content of less than 6 at. % may have been used to manufacture components with a high ductility. Specifically, boron compositions in iron-based amorphous alloys may include: about 0.5 at. %, such at least 1 at. %, such as at least 2 at. % such as at least 5 at. % such as at least 7.5 at. % such as at least 10 at. %. Carbon compositions may include: about 2 at. %, such at least 5 at. %, such as at least 10 at. %. Inclusion of boron and carbon also improves the corrosion resistance of Fe—Cr-based amorphous metallic alloys.

It has been demonstrated that increasing chromium content by a factor of four correspondingly increases fracture by a factor of five. In addition, the ductility of iron-based amorphous alloys may also be improved by replacement of elements that enhance the created ionic and covalent bonds. For instance, chromium and molybdenum can reduce shear resistance and improve plasticity. Chromium compositions may include: about 15 at. % such at least 20 at. %, such as at least 25 at. %, such as at least 30 at. %, such as at least 35 at. %, and such as at least 40 at. %. Molybdenum compositions may include: about 10 at. %, such at least 15 at. %, such as at least 20 at. %, such as at least 25 at. %, and such as at least 30 at. %.

An iron-based composition suitable for forming an amorphous alloy and/or material is shown by the following chemical formula: $Fe_{100-(a+b+c+d)}Cr_aMo_bC_cB_d$, where "a" is in the range of from 10 to 35, "b" is in the range of from 10 to 20, "c" in the range of from 2 to 5 and "d" in the range of from 0.5 to 3.5 in atomic percentages, as shown by the differential scanning calorimetry ("DSC") analysis of an thereof in FIG. 3.

Further study of the above-described iron-based amorphous alloy composition has indicated that the formation of an amorphous structure during solidification of metallic amorphous liquids is a competing process between: (1) solidification of amorphous phases; and, (2) crystalline phases. There are various contributing factors that can enhance amorphous phase stability and increase crystallization formation resistance, both of which also influence glass-forming-ability ("GFA").

Relevance of Oxygen Content Levels in Amorphous Alloys; Critical Limit of 0.2 at. % Oxygen The presence of oxygen in amorphous alloys can also affect the crystalline phases which form upon crystallization and the thermal stability of the alloy, as well as physical properties of the alloy. For instance, the inclusion of oxygen in amorphous alloys enhances brittleness thereof, such that the alloys with oxygen content above 0.2 at. % oxygen may fracture upon bending without plastic deformation and were not susceptible to shear.

As discovered upon evaluation of the iron-based composition suitable for forming an amorphous alloy having the chemical formula: $Fe_{100-(a+b+c+d)}Cr_aMo_bC_cB_d$, where "a" is in the range of from 10 to 35, "b" is in the range of from 10 to 20, "c" in the range of from 2 to 5 and "d" in the range of from 0.5 to 3.5 in atomic percentages, the GFA thereof may be improved upon should oxygen impurities be maintained at relatively low (e.g., beneath 0.2 at. %) concentration levels. Such a critical level of oxygen between 0 and 0.2 at. % oxygen may be effective in enhancing the GFA of the disclosed iron-based amorphous alloy composition since the presence of oxygen can initially increase crystallization resistance by suppressing precipitation of the competitive primary phase, and oxygen can stabilize glass-forming liquid as created by a decrease in the liquidus temperature. However, oxygen levels above the critical level of 0.2 at % oxygen will destabilize the iron-based amorphous alloy in liquid phase and induce the formation of the more stable oxygen-containing crystalline phase, thus, in turn, reducing the GFA of the amorphous alloy. Specifically, at high concentrations levels oxygen impurities have a deteriorating effect on the GFA of iron-based amorphous alloys since oxygen reduces the supercooled liquid region and induces formation of oxygen-containing quasi-crystalline phases with lower activation energy than competing primary crystalline phases. Thus, as indicated by study of the above-described iron-based amorphous alloy composition, the oxygen limit to improve GFA is at 2,000 ppm or 0.2 at. % oxygen. Above this limit, the GFA deteriorates.

In an embodiment, an iron-based amorphous metallic powder, e.g., such as the disclosed iron-based composition having the chemical formula: $Fe_{100-(a+b+c+d)}Cr_aMo_bC_cB_d$, where "a" is in the range of from 10 to 35, "b" is in the range of from 10 to 20, "c" in the range of from 2 to 5 and "d" in the range of from 0.5 to 3.5 in atomic percentages, has an oxygen content less than 0.2 at. %, such as less than 0.15 at. %, such as less than 0.1 at. %, such as 0.05 at. %. This oxygen level improves the GFA of iron-based amorphous alloy powder and enhances the processing ability of the said powder via different additive manufacturing methods.

Studies have shown difficulties associated with producing amorphous alloys with oxygen levels above 0.2 at. % oxygen, as well as the formation of crystalline phases above 0.2 at. % oxygen, e.g., for the purposes of comparison to the disclosed amorphous alloy composition. For example, "[f]or the $Zr_{50-x/2}Cu_{50-x/2}O_x$ alloys, glasses were obtained with up to 8 a/o [e.g., at. %] oxygen by using the arc-melting quench unit; attempts to obtain the amorphous phase for alloys containing 10 a/o oxygen were unsuccessful . . . . [And,] it was found that the addition of oxygen progressively reduces the glass forming ability so that alloys containing 8 a/o and, to a lesser extent, 6 a/o oxygen could be made amorphous only with great difficulty." [Source: "The Effect of Oxygen Additions on the Properties of Amorphous Transition Metal Alloys"; D. E. Polk, C. E. Dube, B. C. Giessen; Northeastern Univ.; Boston, Mass.; Inst. Of Chem. Analysis (1978)].

Other studies and tests have demonstrated a correlation between oxygen levels and the viscosity of metallic glasses. [Source: "Influence of oxygen on the viscosity of Zr—Al—Cu—Ni metallic glasses in the undercooled liquid region"; A. Kubler, J. Eckert, A. Gebert, L. Schultz; Journal of Applied Physics 83, 3438 (1998)]. In detail, "[f]or rapidly quenched ribbons, oxygen contents≤0.8 at. % do not drastically affect the viscosity of the glassy phase, but changes in the composition of the metallic constituents are more significant. For slowly cast samples, oxygen levels above 0.3 at. % lead to an increase in viscosity due to formation of crystalline phases. In contrast, mechanical alloying provides completely amorphous powders even for oxygen contents above 2 at. %." Source: "Influence of oxygen on the viscosity of Zr—Al—Cu—Ni metallic glasses in the undercooled liquid region"; A. Kubler, J. Eckert, A. Gebert, L. Schultz; Journal of Applied Physics 83, 3438 (1998)].

Research has also been conducted in areas concerning oxygen embrittlement in Zr-based bulk amorphous alloys. [Source: "Oxygen Embrittlement and Effect of the Addition of Ni Element in a Bulk Amorphous Zr—Cu—Al Alloy"; Y. Yokoyama, A. Kobayashi, K. Fukaura, A. Inoue; Materials Transactions, Vol. 43, No. 3 (2002) pp. 571 to 574]. Specifically, "[t]he oxygen embrittlement of Zr-based crystalline alloy is originated from the sticking of operable dislocations by oxygen atoms, which are intruded into the dislocation core. For the Zr-based bulk amorphous alloy, dissolved oxygen atoms seem to affect . . . the amorphous structure." [Source: "Oxygen Embrittlement and Effect of the Addition of Ni Element in a Bulk Amorphous Zr—Cu—Al Alloy"; Y. Yokoyama, A. Kobayashi, K. Fukaura, A. Inoue; Materials Transactions, Vol. 43, No. 3 (2002) pp. 571]. And, "the embrittlement of crystalline Zr-based alloys results from the oxygen atoms, which act as the stopping medium of operable dislocations. The oxygen embrittlement in Zr-based crystalline alloys occurs even in a small amount of oxygen content range above 800 ppm." Further, "crystallization occurs when the oxygen content exceeds a threshold value of about 0.2 at. %." [Source: "Oxygen Embrittlement and Effect of the Addition of Ni Element in a Bulk Amorphous Zr—Cu—Al Alloy"; Y. Yokoyama, A. Kobayashi, K. Fukaura, A. Inoue; Materials Transactions, Vol. 43, No. 3 (2002) pp. 574].

Relevance of the Geometric Shape of Particles and/or Feedstock Used in Additive Manufacturing 3D printed parts, inclusive of those produced by layer-by-layer deposition additive manufacturing related techniques and processes, tend to be brittle and weak if poorly designed. However, by using a combination of proven design practices, print settings, and quality filament and/or feedstock, the strength and durability of 3D printed parts may be significantly increased. The quality and physical properties of feedstock used in additive manufacturing applications can also dictate the quality of 3D printed parts. For instance, "[a]dditive manufacturing with fused deposition modeling (FDM) is currently optimized for a wide range of research and commercial applications. The major disadvantage of FDM-created products is their low quality and structural defects (porosity), which impose an obstacle to utilizing them in functional prototyping and direct digital manufacturing of objects intended to contact with gases and liquids." [Source: Improvement of quality of 3D printed objects by elimination of microscopic structural defects in fused deposition modelling; Evgeniy G. Gordeev, Alexey S. Galushko, Valentine P. Ananikov; Public Library of Science (PLOS One) (2018).]

Moreover, "the wall permeability of a printed object depends on its geometric shape and is gradually reduced in a following series: cylinder>cube>pyramid>sphere>cone. Filament feed rate [ . . . and] wall geometry . . . were found as primary parameters that influence the quality of 3D-printed products. Optimization of these parameters led to an overall increase in quality and improvement of sealing properties." [Source: Improvement of quality of 3D printed objects by elimination of microscopic structural defects in fused deposition modelling; Evgeniy G. Gordeev, Alexey S. Galushko, Valentine P. Ananikov; Public Library of Science (PLOS One) (2018)]. Thus, the importance of physical properties includes, aside from the importance of control of oxygen content at or beneath 0.2 at. % as discussed earlier, at least the following: sphericity, flowability, particle size and distribution, homogeneity and porosity. For instance, there is a defined correlation between particle shape and flowability for fine powders. [Source: "Correlation between physical properties and flowability indicators for fine powders"; A Thesis Submitted to the College of Graduate Studies and Research in partial fulfilment of the requirements for the degree of Master of Science in the Department of Chemical Engineering University of Saskatchewan Saskatoon (2006), Saskatchewan; Abhaykumar Bodhmage]. Notably, "[p]article size was found to be the most reliable indicator of powder flowability, with decreasing particle size corresponding to lower flowability; however other parameters such as particle elongation and irregularity, were also found to have an influence on powder flowability." [Source: "Correlation between physical properties and flowability indicators for fine powders"; A Thesis Submitted to the College of Graduate Studies and Research in partial fulfilment of the requirements for the degree of Master of Science in the Department of Chemical Engineering University of Saskatchewan Saskatoon (2006), Saskatchewan; Abstract; Abhaykumar Bodhmage].

And, "the flowability increases as the particles become more spherical. The spherical particles tend to rotate easily in a rotating drum, also spherical particles provide comparatively less resistance to the flow of neighbouring particles." [Source: "Correlation between physical properties and flowability indicators for fine powders"; A Thesis Submitted to the College of Graduate Studies and Research in partial fulfilment of the requirements for the degree of Master of Science in the Department of Chemical Engineering University of Saskatchewan Saskatoon (2006), Saskatchewan; p. 70; Abstract; Abhaykumar Bodhmage]. Thus, as can be seen from recent studies, smooth, spherical or otherwise regular-shaped particles tend to flow more easily than particles having rough surfaces and/or irregular shapes. In addition, spherical or substantially spherical particles tend to pack more efficiently and/or effectively than the particles having irregular shapes. In an embodiment, iron-based amorphous powder has a sphericity of more than 80%, such as more than 85%, such as more than 90%, such as more than 95% and such as more than 98%. In another embodiment, a flowability of spherical or substantially spherical particles could be less than about 30 s/50 g.

In addition to the correlation between particle shape and flowability as described, fine powders (e.g., those composed of fine or small-sized grains) possess a higher attraction and cohesive strength between individual particles. Fine powders also have a wall friction (e.g., friction encountered at a wall surface of the particle) that is higher than the coarser particles. Thus, fine particles usually have a lower flowability compared to coarser particles. However, for additive manufacturing, the density of amorphous powder deposited layer-by-layer should be as high as possible to manufacture dense parts. Such a desirable high packing powder density is achieved with a distribution that includes both coarse and fine particles, where finer particles fill the interstices by coarser particles. In an embodiment, iron-based amorphous powder has a particle size of larger than 10 micrometers, such as larger than 15 micrometers, and such as larger as than 20 micrometers.

Along with particle size and shape, particle size distribution plays a crucial role in powder packing. For instance, powder packing density ratios may include a bimodal mixture of powders with fine particles comprising not more than 30% of the mix, with coarser particles comprising the balance. In an embodiment, the powder packing density may be increased to reach 30%. In another embodiment, the particle size distribution of the said powder is bimodal with fine particles not exceeding 30% in volume, such as less than 25%, such as less as 20%, such as less as 15%, such as less as 10% and such as less as 5%.

Figure 5:
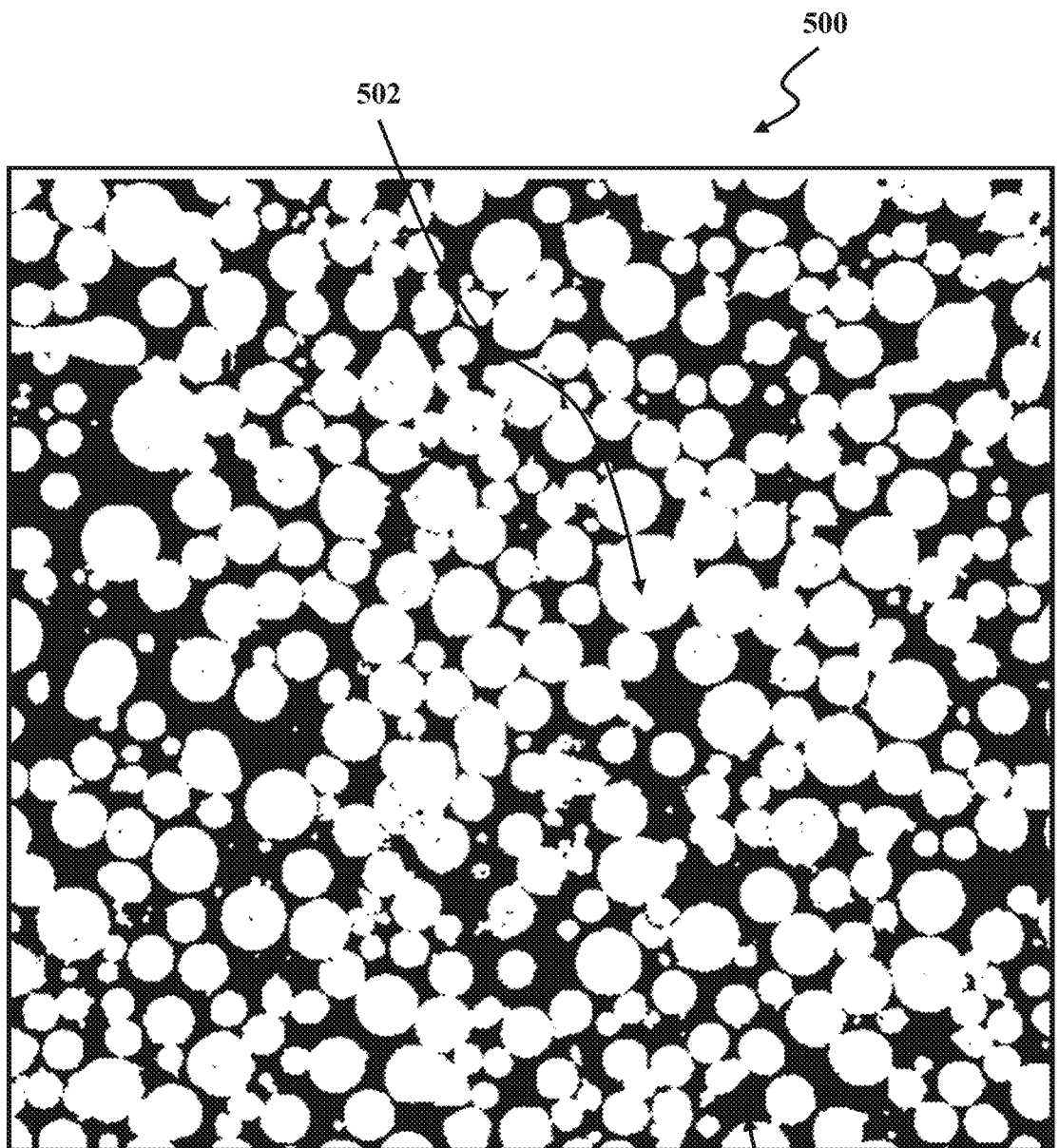
FIG. 5 is a light-microscopy generated image of an amorphous powder.
Figure 6:
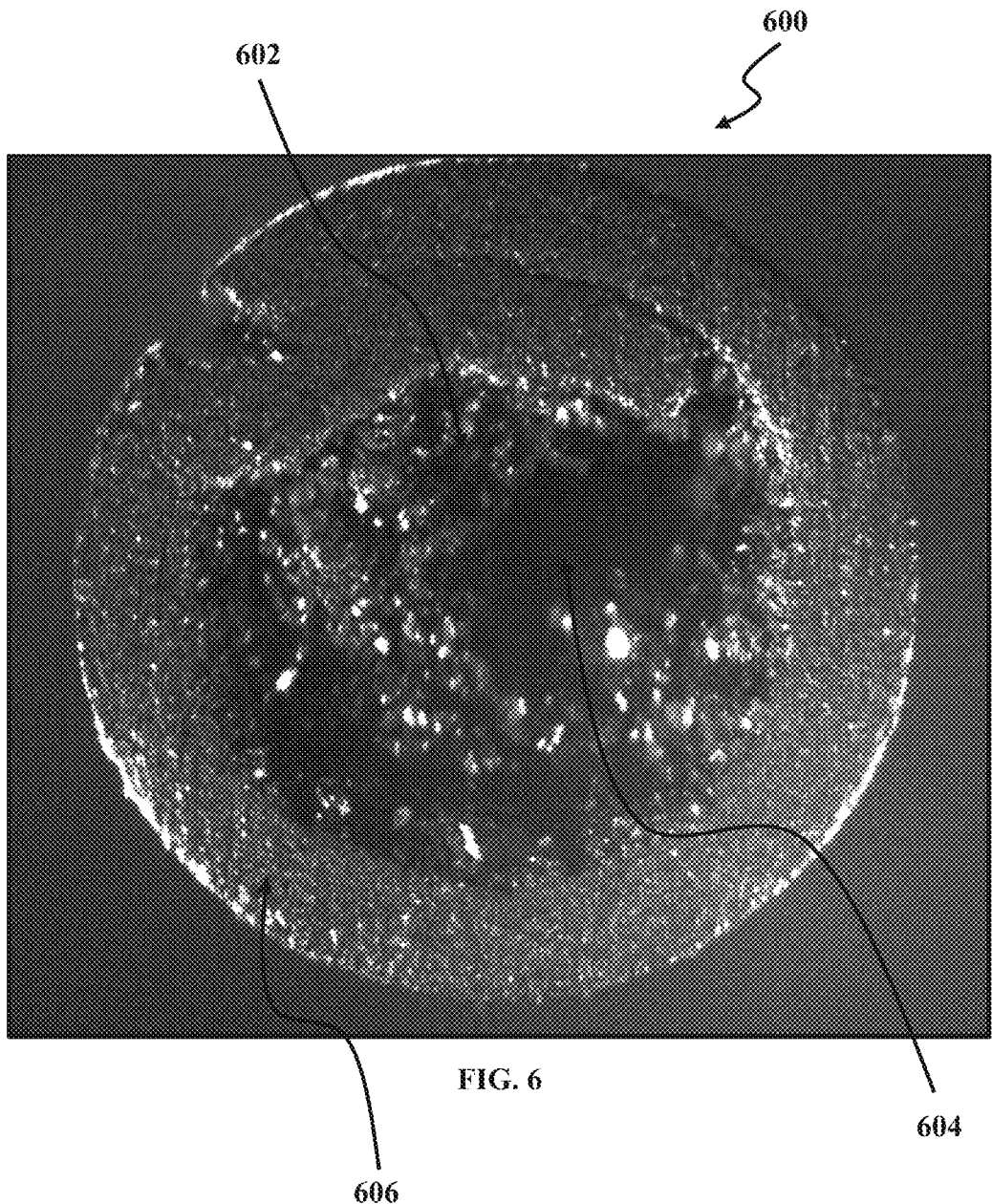
FIG. 6 is a cross-sectional view of a wire fabricated from an amorphous powder.

Amorphous materials may be provided as feedstock for additive manufacturing processes in powder form (as shown in FIG. 5), wire (as shown in FIG. 6) or foil form and be built layer-by-layer by various additive manufacturing techniques including (but not limited) to: laser additive manufacturing, electron beam additive manufacturing and ultrasonic additive manufacturing. FIG. 5 shows an image 500 with several particles 502 separated by interstitial spaces 504. Superior properties of 3D printed parts using amorphous material feedstock in powder form may be achieved due to the amorphous structure of the materials, as well as the fine powder form of the feedstock.

Similarly, provision of amorphous material in wire form as shown in FIG. 6 for additive manufacturing may also contribute to achieving desirable properties of 3D printed parts. FIG. 6 shows an image of a wire 600 having a region 602 contained therein with a defined density within a periphery region 606 that also bounds a substantially hollow region 604. One skilled in the art will appreciate that various configurations of the wire 600 may exist without departing from the scope and spirit of the disclosed embodiments.

Amorphous metals, alloys and materials are more corrosion resistant compared to conventional metals as they lack long-range periodicity, related grain boundaries and crystal defects such as dislocations. In addition, they are stronger than crystalline metals and can sustain larger reversible deformations than crystalline alloys. In an embodiment, the disclosed powder may have, in addition to the constituents described earlier, a high chromium content to create a thin chromium oxide layer upon deposition that further improves corrosion resistance of the manufactured parts when exposed to various corrosive environments.

Various Additive Manufacturing Methods

In another embodiment, various additive manufacturing methods of the disclosed amorphous alloy materials are provided, including the following: Direct Powder Bed; Powder/Wire-fed Systems (Direct Energy Deposition—DED); Ultrasonic Additive Manufacturing; Binder Jetting, etc.

Figure 7:
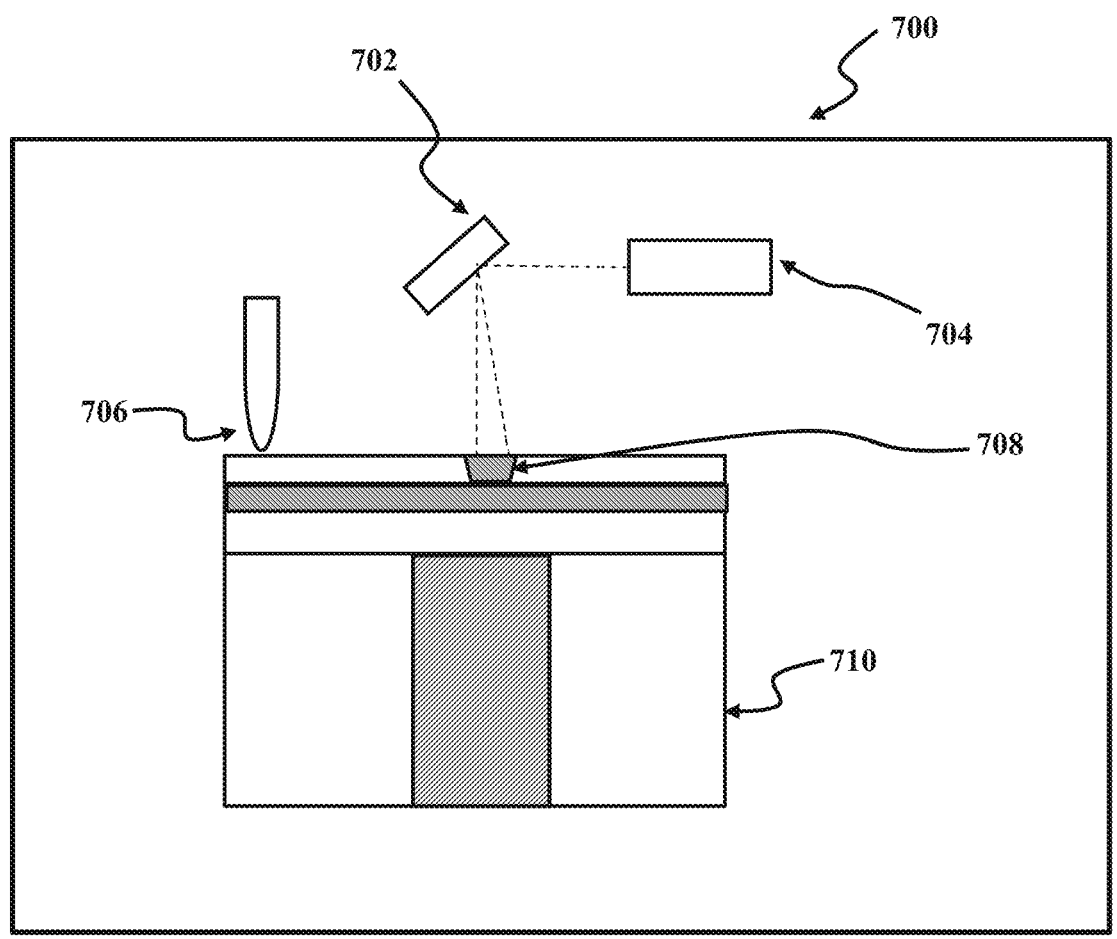
FIG. 7 is a schematic diagram of a powder bed additive manufacturing method.

An example of the Direct Powder Bed processing method is shown in FIG. 7 and includes Selective Laser Melting ("SLM"), Selective Laser Sintering ("SLS"), Laser Cusing, Direct Metal Laser Sintering ("DMLS") and Electron Beam Melting ("EBM") processes. FIG. 7 shows an apparatus 700 for Direct Powder Bed processing that includes various pieces of equipment configured to fabricate or manufacture a part 708. The starting material for the SLM process is powder (e.g., an amorphous powder), which is applied (e.g., by layer-by-layer deposition) as a thin layer (20-100 μm) to a substrate placed in a closed process chamber. The powder is selectively melted, for example, by a laser or electron beam 704 that provides heat in the case of laser additive manufacturing to match the calculated surfaces of the CAD model. Light or electrons may be redirected and focused on the part 708 or surrounding region by an optic 702 (e.g., a lens, a mirror and/or the like). In an embodiment, a recoater 706 may be positioned near the part 708 to, for example, apply additional coatings of material, e.g., amorphous material, if so desired. During the SLM process, the substrate is intermittently lowered to accommodate a new layer of powder to be deposited there-upon, where this layer is again selectively melted by the laser beam and metallurgically fused to the layer beneath, e.g., the previously deposited layer. This process is repeated iteratively until the component is built up, e.g., upward from a base layer. Thus, a tailor-made component may be produced in a layer-by-layer manner from the powder material.

Amorphous alloys are generally processed and formed by cooling a molten alloy from above the melting temperature of the crystalline phase to below the glass transition temperature at required cooling rates, such that the nucleation and growth of alloy crystals is avoided. To ensure a full amorphous structure in the cooled molten alloy, a cooling apparatus may be added to the apparatus 700 including capabilities directed to the cooling of plates or cooling of molten areas. This will support the rapid cooling, often referred to as "freezing" in the art, of molten glass to fabricate 3D printed parts with a fully dense structure. Suitable cooling rates may be in the range of $10^4$ to $100°$ C. per second, which is sufficiently high to retain the amorphous state of the materials chosen to engineer cleats. Preferably, the cooling rate will be set at less than $1,000°$ C. per second. In addition, depending on the cooling rates and process operational conditions, parts with a fully amorphous structure or a composite with various amorphous phase content may be fabricated. The amorphous phase content may be 5 to 100%, preferably 50% and higher.

Another example of processing method of this material is Powder-Fed method (FIG. 8) that includes: Laser Engineering Net Shape (LENS), Laser Metal Deposition powder (LMD-p) and Laser Cladding. Likewise, wire-fed deposition includes: Laser Metal Deposition-wire (LIVID-w), Electron Beam Additive Manufacturing (EBAM), Plasma Wire Deposition (PWD), and Wire Arc Additive Manufacturing (WAAM). These processes are highly precise and the thickness of a layer of material varies between 0.1 mm and several millimeters. The metallurgical bonding of the cladding material with the base material and the absence of undercutting are some features of these types of processes. In contrast to other welding technologies, these methods have a low heat input that penetrates to the underlying layers or substrates. In addition, these methods can be used to repair an existing part in a layer-by-layer manner. Fully amorphous and partially amorphous parts may be manufactured based on processing conditions (e.g., as shown in the X-Ray Diffraction ("XRD") of a 3D printed part fabricated from an amorphous powder of FIG. 4B). The amorphous phase content may be 5 to 100%, preferably 50% and higher.

Figure 8:
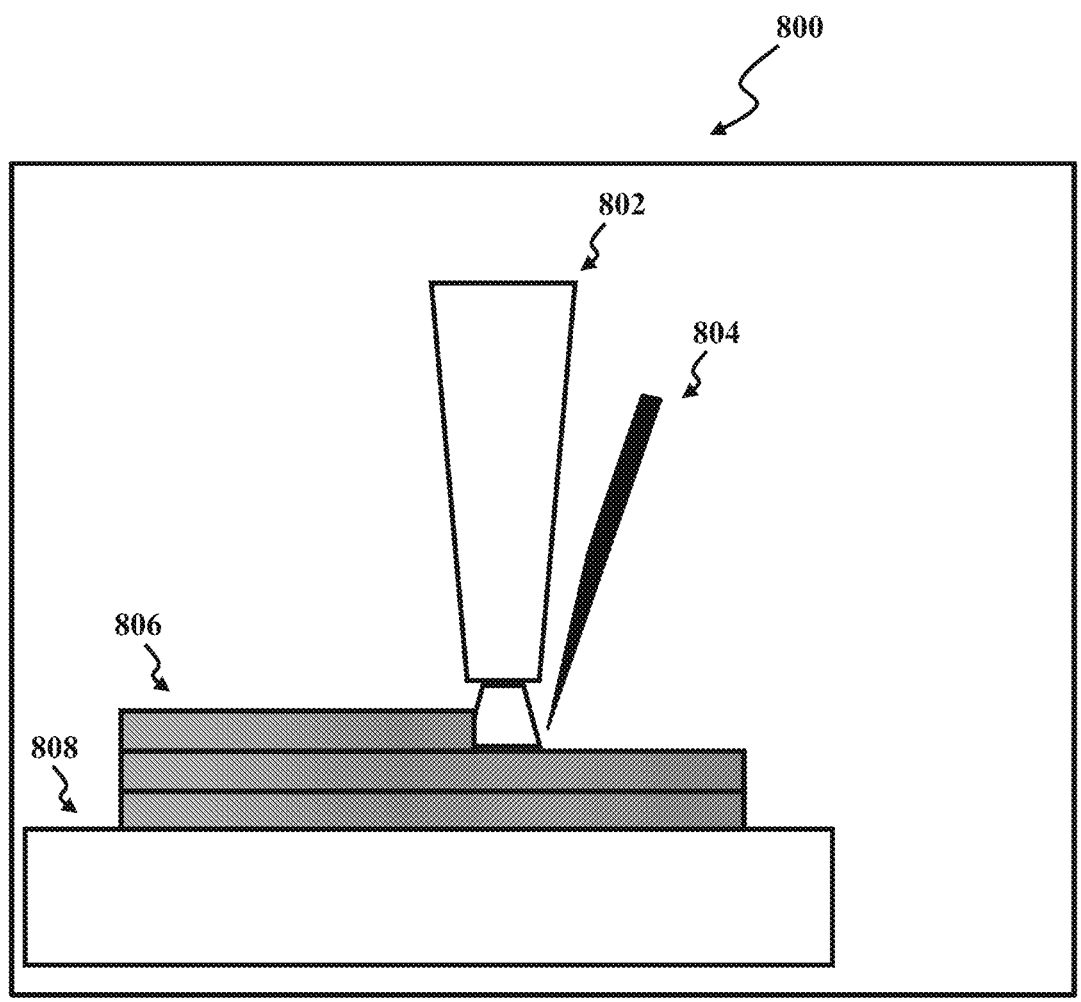
FIG. 8 is a schematic diagram of a direct deposition additive manufacturing method.

FIG. 8 shows an apparatus 800 suitable for use for Powder-Fed method additive manufacturing to generate partially or fully amorphous structures using the disclosed amorphous materials as feedstock. Apparatus 800 includes a torch 802 positioned above a part 806 (shown as being fabricated in a layer-by-layer manner), where the torch 802 melts material, e.g., amorphous material, fed to a target substrate location, such as a base plate 808, by a wire or powder feeder 804. One skilled in the art will appreciate that alternative arrangements or configurations of the apparatus 800 shown in FIG. 8 may exist without departing from the scope and spirit of the disclosed embodiments.

Figure 9:
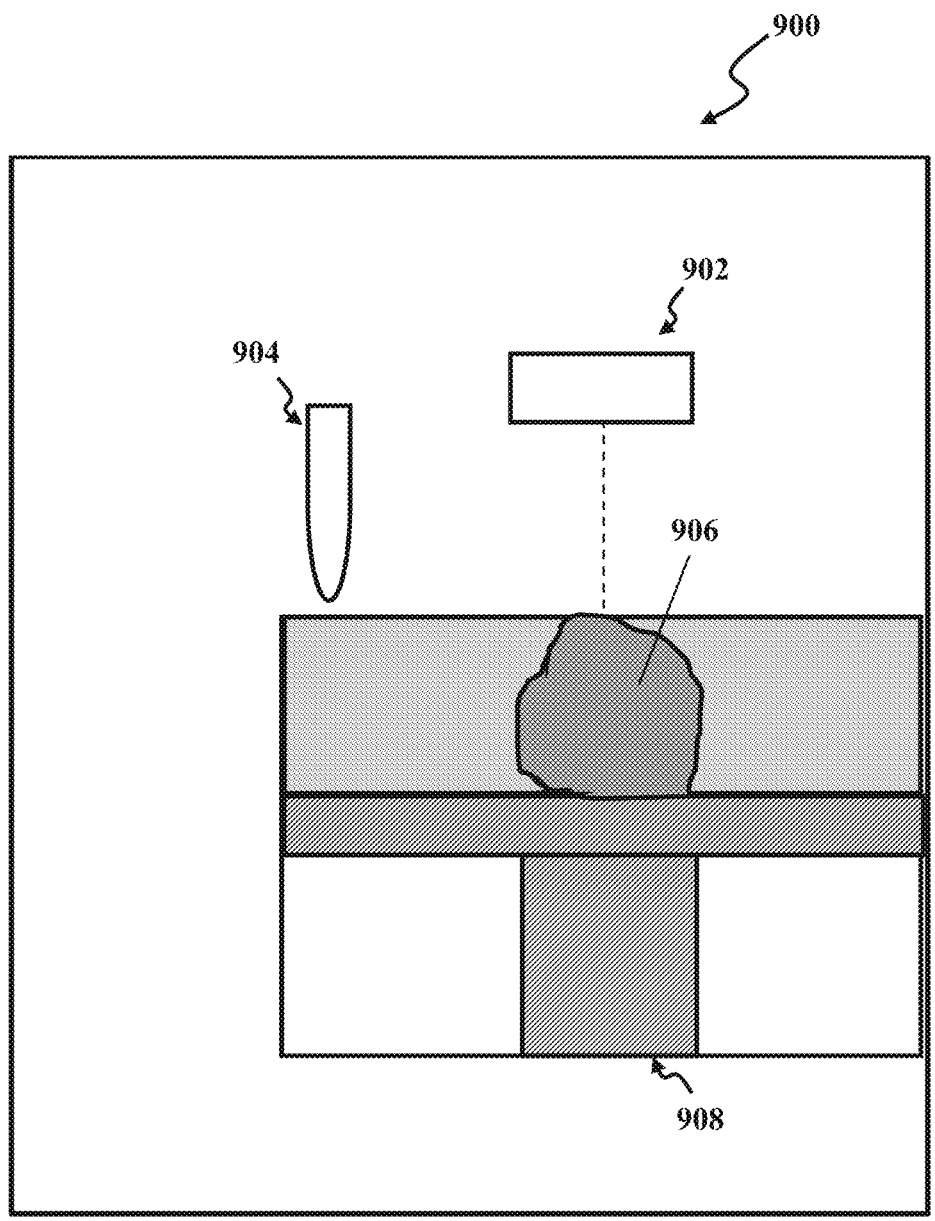
FIG. 9 is a schematic diagram of a binder jetting additive manufacturing method.

In another embodiment, layer-by-layer Binder Jetting additive manufacturing techniques to generate partially or fully amorphous structure of disclosed materials after manufacturing process are provided as shown in FIG. 9. Specifically, two different processes are included:

(1): 3D Binder jetting of fully amorphous materials that are burned in an inert atmosphere and are infiltrated with low melt eutectic and non-eutectic alloys to manufacture partially or fully amorphous 3D structured parts are provided. Low melt, fusible eutectic and non-eutectic alloys have a melting point much lower than the crystallization temperature of said amorphous metallic alloys, allowing to maintain the amorphous structure of said materials, while the infiltrated material will be either amorphous in case of non-eutectic alloys or crystalline in case of eutectic alloys. An example apparatus 900 of a 3D Binder jetting device is shown in FIG. 9. The apparatus may include a binder jetting nozzle 902 positioned above a part 906 that rests on a piston 908. A recoater 904 may be positioned to a side of the binder jetting nozzle 902 and above the part 906 to apply coatings of additional material to finish the part 906 as desired. One or ordinary skill in the art will appreciate that alternative configurations or arrangements of the apparatus 900 may exist without departing from the scope and spirit of the disclosure.

(2): Layer-by-layer additive manufacturing of said amorphous alloys by using low melt, fusible eutectic and non-eutectic alloys instead of binder in binder jetting technology. Solidification of low melt alloys is accomplished at a much lower temperature than the crystallization temperature of said amorphous alloys by maintaining amorphous structure and not affecting the previous layers. This embodiment provides a faster and cheaper process than the previous approach (e.g., 3D Binder jetting of fully amorphous materials).

Figure 10:
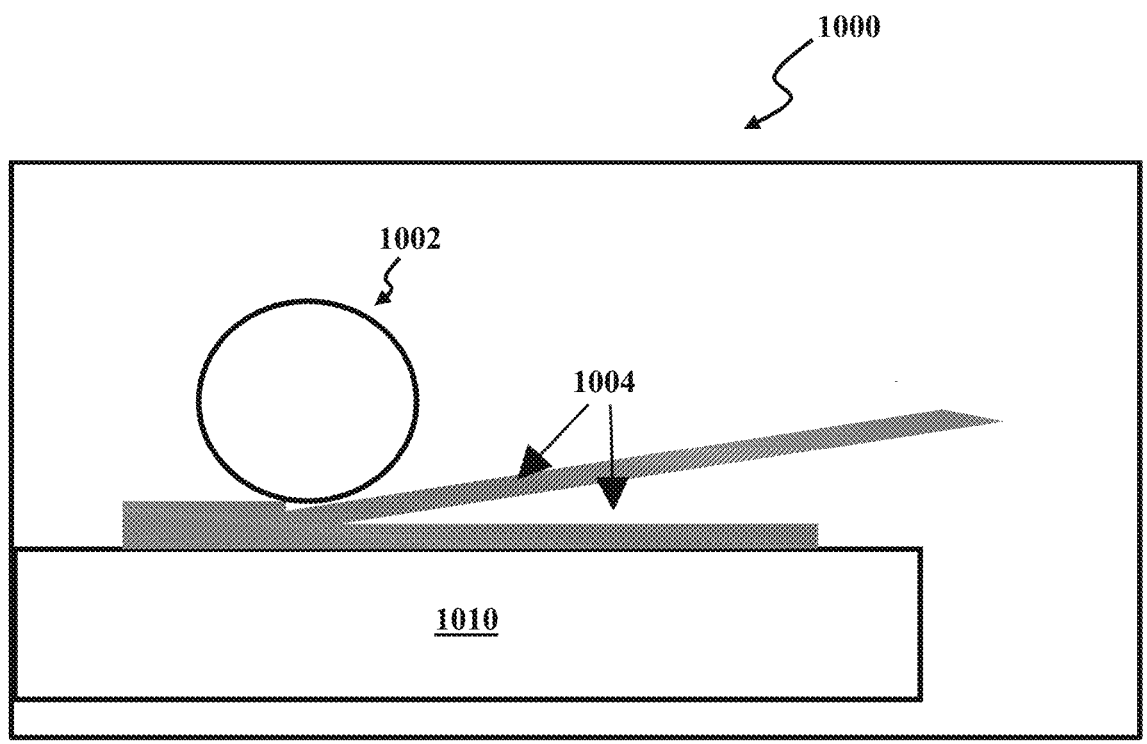
FIG. 10 is a schematic diagram of an ultrasonic additive manufacturing method.

Another processing method is Ultrasonic Additive Manufacturing that uses thin foils as feedstock (as shown in FIG. 10). The process produces true metallurgical bonds with full density. The fundamental distinguishing characteristic of UAM is that it is a solid-state welding process meaning that melting of metals does not occur and has no impact on material properties. FIG. 10 shows an apparatus 1000 with various components associated therewith. Specifically, ultrasonic vibrations, generated by transducers attached to a sonotrode 1002, scrub against iron-based amorphous foils 1004 creating an ultrasonic solid-state weld between the thin metal tape and an underlying layer or baseplate. Such foils 1004 may have each have a thickness of 250 micrometers or less. Successive foil layers are cold-welded to build up and generate desired shapes and sizes. Since the ultrasonic additive manufacturing process occurs at low temperatures, much lower than the melting temperatures of the amorphous metallic foils, the amorphous structure and multifunctional properties such as ultra-high strength and high toughness are maintained, allowing for the manufacture of fully amorphous 3D printed. Further, by introducing more heat on the interface between foils, composites of crystalline phases in amorphous matrices in the interface between foils may be generated. The amorphous phase content could be 5 to 100%, preferably 50% and higher.

Figure 11A:
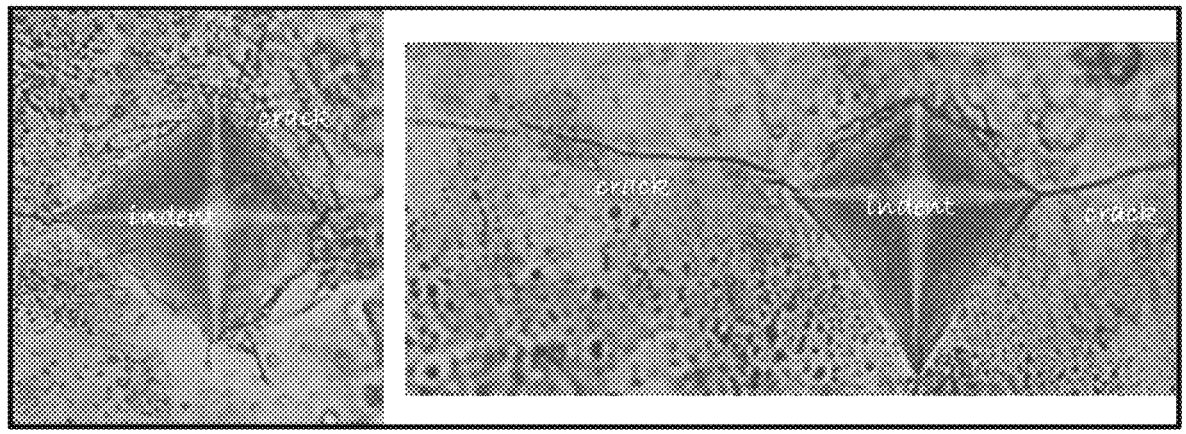
FIG. 11A is a light microscopy generated image of hardness indentation for parts manufactured by laser additive manufacturing of an amorphous powder.

FIG. 11A is a light microscopy generated image of hardness indentation for parts manufactured by laser additive manufacturing of an amorphous powder.

Figure 11B:
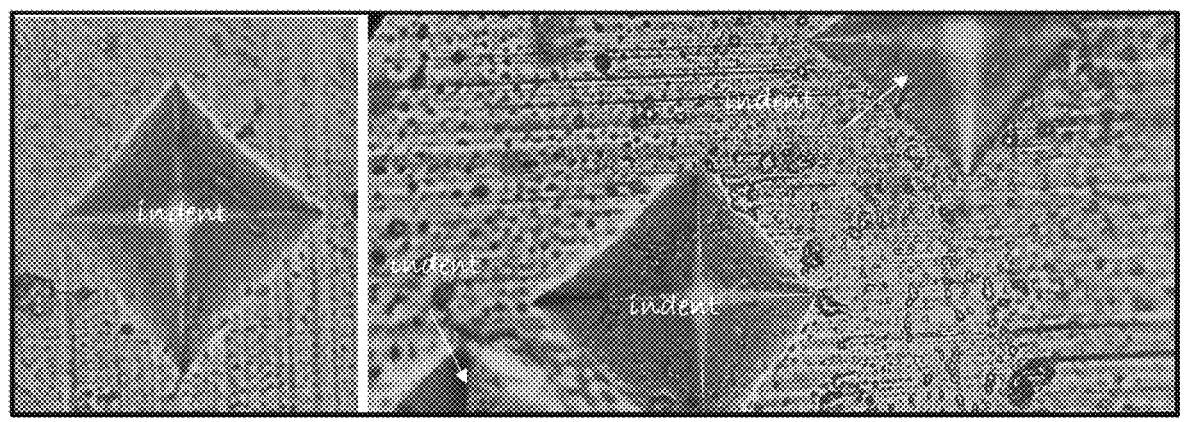
FIG. 11B is a light microscopy generated image of hardness indentation for parts manufactured by laser additive manufacturing of an amorphous powder.

FIG. 11B is a light microscopy generated image of hardness indentation for parts manufactured by laser additive manufacturing of an amorphous powder.

In another embodiment, additive manufacturing techniques to maintain the amorphous structure of materials during and after manufacturing process are provided. Two different process approaches are provided:

(1): the complete melting amorphous powder, and subsequent re-solidification to amorphous structure to eliminate the formation of a crystalline structure therein by controlling the heating source power and cooling rate without affecting previous deposited layers.

(2): the partial melting of an outer surface of the amorphous powder, and subsequent solidification powder particles with each-other without undergoing a complete melting stage.

In an embodiment, phase transformation or surface modification to obtain beneficial effects on mechanical properties due to stress-activated reversible phase transformation are provided. The transformable or modified non-amorphous material should be of a glass-forming composition that are able to generate a thin layer of the amorphous materials when they are exposed to wear, load or friction. Because the transformation is induced from environmental exposure, the protection layer on the surface of the cleats is always maintained. Frictionally transformable materials in accordance with the present invention and the method to generate them are also described under U.S. Pat. No. 4,725,512.

With respect to hardness, in one embodiment, parts manufactured from these amorphous alloys can have a hardness value of above about 400 Vickers 100 g, such as above about 600 Vickers 100 g, such as above about 800 Vickers 100 g, such as above about 1000 Vickers 100 g, such as above about 1200 Vickers 100 gm, such as above about 1400 Vickers 100 g.

Figure 12:
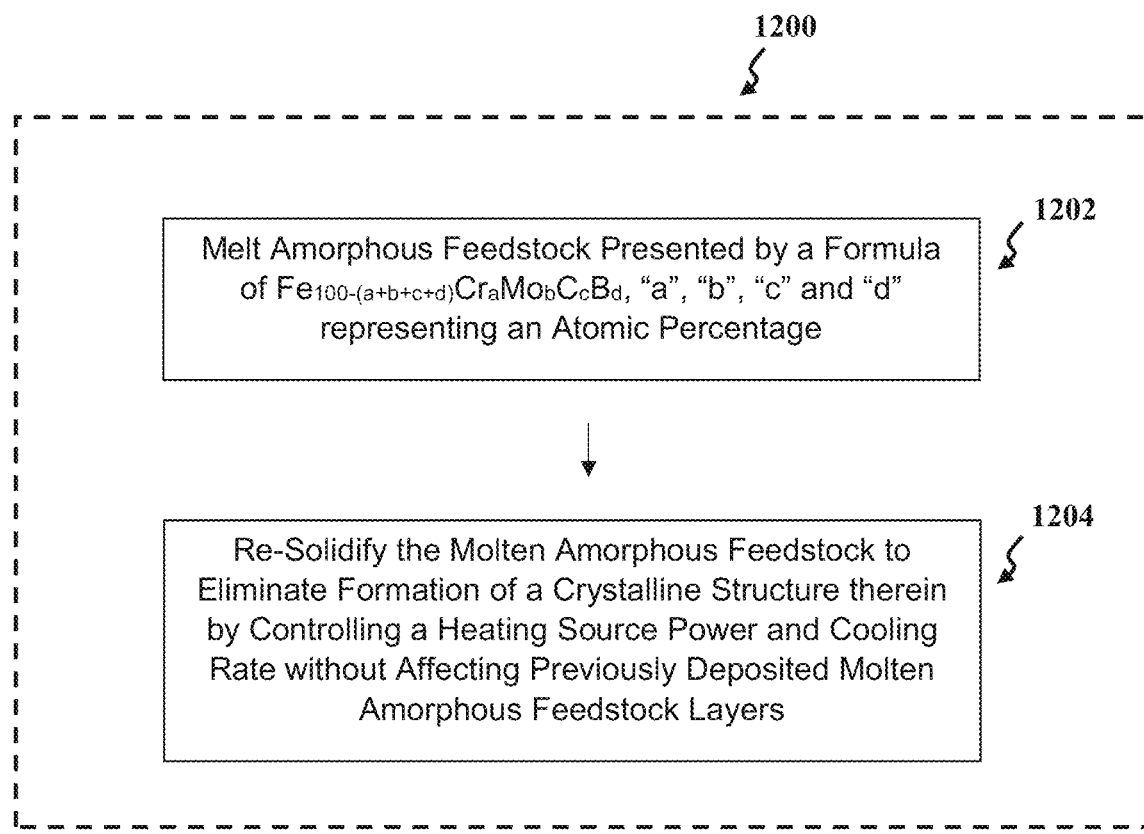
FIG. 12 is a flowchart of a method to melt and re-solidify amorphous feedstock.

A flowchart 1200 is shown in FIG. 12 for the melting of amorphous feedstock shown in operation 1202 with the later re-solidification of the molten amorphous feedstock in operation 1204 to eliminate the formation of a crystalline structure therein. Operation 1202 involves the melting of amorphous feedstock, which may be presented by a formula of $Fe_{100-(a+b+c+d)}Cr_aMo_bC_cB_d$, where "a" is in the range of from 10 to 35, "b" is in the range of from 10 to 20, "c" in the range of from 2 to 5 and "d" in the range of from 0.5 to 3.5 in atomic percentages. Operation 1204 follows operation 1202 and involves the re-solidification of the molten amorphous feedstock to eliminate the formation of a crystalline structure therein by controlling a heating source power and cooling rate without affecting previously deposited molten amorphous feedstock layers.

Figure 13:
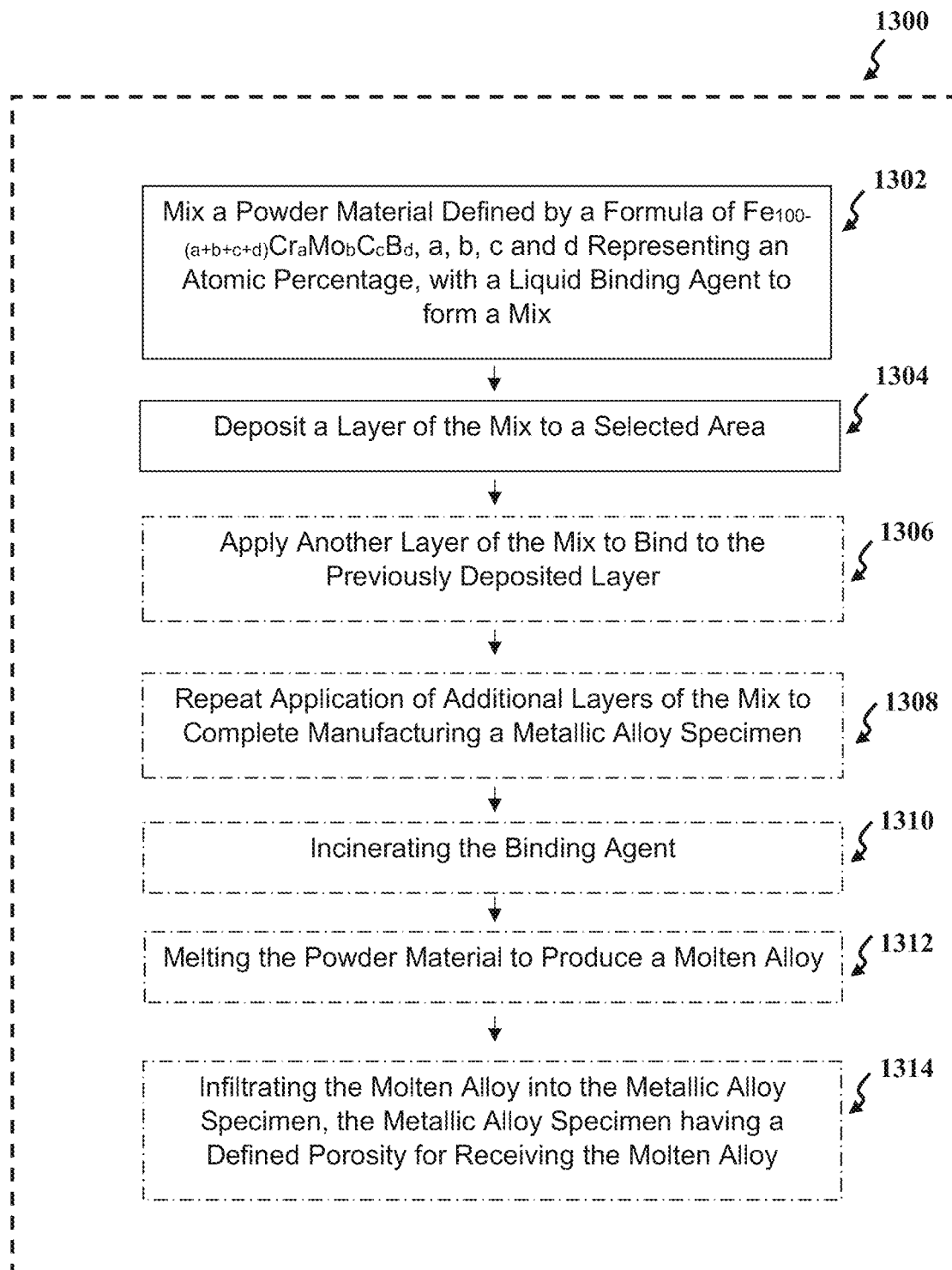
FIG. 13 is a flowchart of a method to mix a powder material having a defined formula with a liquid binding agent to deposit a layer of the mix to a selected area.

Another flowchart is shown in FIG. 13 for the mixing of a powder material that may be defined by a formula of $Fe_{100-(a+b+c+d)}Cr_aMo_bC_cB_d$, where "a" is in the range of from 10 to 35, "b" is in the range of from 10 to 20, "c" in the range of from 2 to 5 and "d" in the range of from 0.5 to 3.5 in atomic percentages with a liquid binding agent to form a mix in operation 1302, with a liquid binding agent to form a mix. The mix may be deposited to a selected area in operation 1304, which follows operation 1302. Operations 1302 and 1304 may be re-completed iteratively in a cyclic manner, e.g., in multiple cycles, to build up a 3D printed object in a layer-by-layer manner.

Operations 1306-1314 are optional for the flowchart 1300 and relate to the building up of a 3D printed object. Specifically, operation 1306 follows operation 1304 and involved the application of another layer of the mix to bind to the previously deposited layer. Operation 1308 involves the repetition of the application of additional layers of the mix to complete manufacturing or fabrication of a metallic alloy specimen. Operations 1310-1314 are optional, as indicated earlier, and may be completed sequentially as shown or interspersed between the other operations as desired. Operation 1310 involves incineration of the binding agent; operation 1312 involves the melting of a powder material to produce a molten alloy; and, operation 1314 involves the infiltration of the molten alloy into the metallic alloy specimen, the metallic alloy specimen having a defined porosity for receiving the molten alloy.

Advantages

Advantages of the disclosed embodiments include providing an iron-based amorphous metallic alloy composition and structure that combines ultra-high strength, moderate density and high hardness without sacrificing toughness. The disclosed amorphous alloys also demonstrate superior corrosion and wear resistance in a single amorphous structure and can be produced at relatively low costs with specifications required for additive manufacturing.

The random organization nature of amorphous metallic alloys makes them free from the typical defects associated with crystalline structures, such as dislocations and grain boundaries. This disordered, dense atomic arrangement and the absence of crystal slip systems determines the unique structural and functional properties of amorphous alloys. Thus, amorphous metals are more corrosion resistant compared to conventional metals due to the lack of long-range periodicity, related grain boundaries and crystal defects such as dislocations. In addition, they are stronger than crystalline metals and they can sustain larger reversible deformations than crystalline alloys. Due to their unique microstructure, amorphous metals combine ultra-high strength, high hardness and ductility in one single material.

As presented and discussed earlier, the formation of an amorphous structure during solidification of metallic amorphous liquids is a competing process between: (1) solidification of amorphous phases; and, (2) crystalline phases. There are various contributing factors that can enhance amorphous phase stability and increase crystallization formation resistance, both of which also influence glass-forming-ability (GFA), which may be improved upon if oxygen impurities are maintained at relatively low concentration. As indicated by evaluating the disclosed amorphous alloy composition, the oxygen limit to improve GFA is at 2,000 ppm or 0.2 at. %. Above this limit, the GFA deteriorates. Accordingly, an advantage of the disclosed embodiments includes providing an iron-based amorphous metallic powder has an oxygen content less than 0.2 at.

EXAMPLE

Figure 4B:
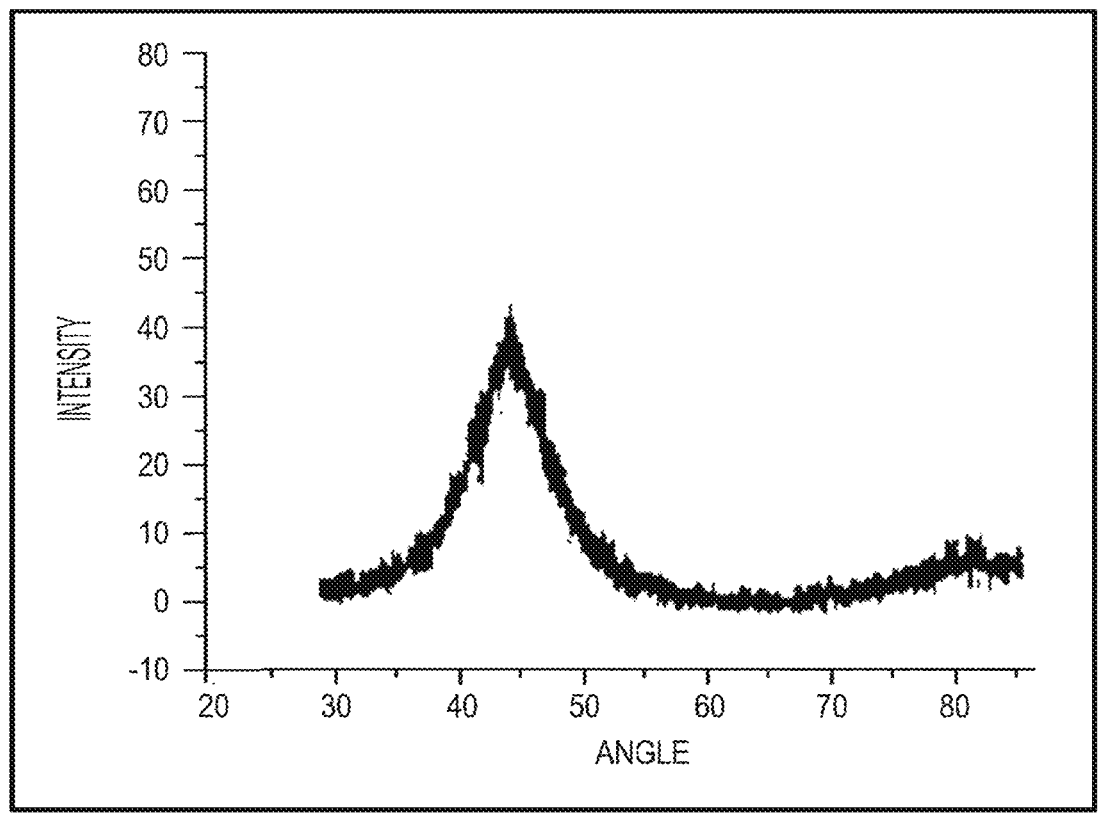
FIG. 4B is an X-Ray Diffraction ("XRD") of a 3D printed part fabricated from an amorphous powder.

A rectangular plate was placed in argon atmosphere and a thin layer of the disclosed amorphous alloy provided in powder form with 2 at. % B and 1 at. % C with an oxygen content less than 0.1 at. % was spread onto the plate. The thin layer was melted using a laser beam. The scanning speed, hatch, power/energy density, scanning pattern and layer thickness were varied during processing and different heating/cooling rates of the melt were achieved. Another layer was applied and the process was repeated to melt and fuse this layer with the previous layer. The X-ray diffraction of the 3D printed part showed that the parts were fully amorphous with no boride or carbide phases or other crystalline phases (FIG. 4B). For some conditions, parts with high hardness above 1,100 Vickers hardness but low toughness were manufactured (FIG. 11A). The quality of the parts regarding amorphocity, hardness and toughness is not improved by decreasing energy density and/or increasing scan speed. For some other conditions, parts with high hardness and toughness were generated (FIG. 11B). The hardness indentations show no cracking and even two indentations in close proximity did not generate a crack to join them showed a high toughness of the printed part. Preferably the said powder has a particle size from 10 micrometers to 60 micrometers and the energy density to manufacture a hard and tough part was preferably above 90 J/mm$^3$.

While the invention has been described in detail with reference to particularly preferred embodiments, those skilled in the art will appreciate that various modifications may be made thereto without significantly departing from the spirit and scope of the invention.

What is claimed is:

1. A method comprising: mixing a powder material having a feedstock composition of iron, chromium, molybdenum, carbon and boron, wherein a level of oxygen in the feedstock composition is up to 0.2 at % oxygen, with a liquid binding agent to form a mix; and depositing a layer of the mix to a selected area, wherein amorphous metal alloy composition has a formula of $Fe_{100-(a+b+c+d)}Cr_aMo_bC_cB_d$, wherein a, b, c and d represent an atomic percentage, wherein: a is in the range of 10 at % to 35 at %; b is in the range of 10 at % to 20 at %; c is in the range of 2 at % to 5 at %; and d is in the range of 0.5% at. % to 3.5 at %; further comprising: applying another layer of the mix to bind to a previously deposited layer, repeating application of additional layers of the mix to complete manufacturing a metallic alloy specimen, incinerating the liquid binding agent, melting the powder material to produce a molten alloy, infiltrating the molten alloy into the metallic alloy specimen, wherein the metallic alloy specimen has a defined porosity for receiving the molten alloy, and cooling the metallic alloy specimen.

2. The method of claim 1, wherein the method comprises additive manufacturing method.

3. The method of claim 1, wherein the metallic alloy specimen has an amorphous phase content of between 20% to 100%.

4. The method of claim 3, wherein the metallic alloy specimen has an amorphous phase content at least 50%.

5. The method of claim 1, wherein the cooling occurs at a cooling rate of $10^{4°}$ C./s to 100° C./s.

6. The method of claim 1, wherein the metallic alloy specimen is at least partially crystalline or wherein an outermost surface of the metallic alloy specimen is phase transformed into an amorphous layer with a thickness of about 250 micrometers or less.

7. The method of claim 1, wherein the powder material has sphericity of more than 80%.

8. The method of claim 1, wherein the powder material has a particle size larger than 10 micrometers.

9. The method of claim 1, wherein the powder material has a flowability of less than 20 seconds per 50 grams.

10. The method of claim 1, wherein the melting of the powder material is done by a heating source.

11. The method of claim 10, wherein the heating source is selected from a group consisting of: a laser, an electron beam, a plasma, an arc, and an infrared source.

12. The method of claim 1, further comprising re-solidifying the molten alloy to eliminate formation of a crystalline structure therein by controlling a heating source and a cooling rate to form an amorphous feedstock layer.

* * * * *